(12) United States Patent
Talmor et al.

(10) Patent No.: US 10,565,634 B2
(45) Date of Patent: Feb. 18, 2020

(54) TRAINING A CHATBOT FOR A DIGITAL ADVERTISEMENT TO SIMULATE COMMON CONVERSATIONS ASSOCIATED WITH SIMILAR DIGITAL ADVERTISEMENTS

(71) Applicant: Facebook, Inc., Menlo Park, CA (US)

(72) Inventors: Yoram Talmor, Cupertino, CA (US); Himanshu Baweja, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 228 days.

(21) Appl. No.: 15/666,433

(22) Filed: Aug. 1, 2017

(65) Prior Publication Data
US 2019/0043106 A1   Feb. 7, 2019

(51) Int. Cl.
| | | |
|---|---|---|
| *G06Q 30/02* | (2012.01) | |
| *G06Q 30/06* | (2012.01) | |
| *G06F 17/27* | (2006.01) | |
| *G06N 20/00* | (2019.01) | |
| *G06F 17/21* | (2006.01) | |
| *G06F 17/24* | (2006.01) | |
| *G06N 3/00* | (2006.01) | |
| *G06Q 50/00* | (2012.01) | |

(52) U.S. Cl.
CPC ....... *G06Q 30/0617* (2013.01); *G06F 17/212* (2013.01); *G06F 17/24* (2013.01); *G06F 17/2785* (2013.01); *G06N 3/006* (2013.01); *G06N 20/00* (2019.01); *G06Q 30/0201* (2013.01); *G06Q 30/0643* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 2008/0215456 A1* | 9/2008 | West | G06Q 30/0613 705/26.41 |
| 2012/0041903 A1* | 2/2012 | Beilby | G06N 3/004 706/11 |

(Continued)

OTHER PUBLICATIONS

"Chatbot Intents: How to Build the Perfect Customer Experience from FAQs" (posted online at https://www.inbenta.com/en/blog/chatbot-intents-faqs-building/ on Jul. 18, 2017) (Year: 2017).*

*Primary Examiner* — James M Detweiler
(74) *Attorney, Agent, or Firm* — Keller Jolley Preece

(57) ABSTRACT

This disclosure covers systems and methods that generate and train a chatbot to automatically communicate with users concerning subjects related to a digital advertisement received for distribution. In particular, the disclosed systems and methods train a chatbot to simulate common conversation exchanges from messaging threads associated with previous digital advertisements that are similar to a received digital advertisement. By training the chatbot to simulate such conversations, the disclosed systems and methods create a chatbot that can immediately respond to a user's inquiries concerning the received digital advertisement and tailor automated exchanges that further the objectives of an advertiser or merchant associated with the received digital advertisement.

20 Claims, 12 Drawing Sheets

(56) References Cited

U.S. PATENT DOCUMENTS

| | | | | |
|---|---|---|---|---|
| 2015/0161521 A1* | 6/2015 | Shah | ................... | G06F 17/278 |
| | | | | 706/12 |
| 2015/0161656 A1* | 6/2015 | Rodriguez | ......... | G06Q 30/0242 |
| | | | | 705/14.44 |
| 2015/0332670 A1* | 11/2015 | Akbacak | ............... | G10L 15/063 |
| | | | | 704/9 |
| 2017/0345014 A1* | 11/2017 | Kochura | .............. | G06Q 30/016 |

* cited by examiner

TRAINING A CHATBOT FOR A DIGITAL ADVERTISEMENT TO SIMULATE COMMON CONVERSATIONS ASSOCIATED WITH SIMILAR DIGITAL ADVERTISEMENTS

BACKGROUND

Users increasingly use networking systems (e.g., social networking systems) to research, view images of, and communicate about products and services offered on the Internet and other networks. With increased network traffic, networking systems have expanded placement of digital advertisements of such products and services. For example, networking systems commonly show digital advertisements on a merchant's profile page and post digital advertisements within newsfeeds of users. In addition to placing such digital advertisements, networking systems commonly provide mechanisms for merchants and advertisers to provide more detailed information concerning the products and services featured in a digital advertisement, such as by posting videos or images featuring an advertised product on a merchant's profile page.

Despite the increased popularity of digital advertising in networking systems, conventional digital-communication techniques provide limited mechanisms for users to inquire and receive immediate responses about advertised products and services. For example, networking systems often provide merchant's or advertiser's email addresses to which users can send inquiries and from which users can receive answers concerning advertisements. But email communications can be slow and provide a user with canned information unsuited to a user's inquiries. Email can also pose security and privacy risks to users by, for example, exposing a user to viruses attached to emails, subjecting a user's email address to repeated emails concerning other products or services, and inadvertently disclosing a user's email address to hackers.

In addition to posting email addresses, networking systems also frequently insert hyperlinks in digital advertisements as another conventional digital-communication technique. In some digital advertisements, for example, hyperlinks direct a web browser or application to a merchant or advertiser's webpage or mobile application. Unfortunately, hyperlinking can direct a network user to excessive amounts of information that fail to address a network user's inquiry. Even webpages that provide answers to frequently asked questions may not address a user's inquiry or may require the user to search or sort through information before locating an answer to an inquiry. In other words, a hyperlink may provide generalized and non-relevant information to a network user.

In addition to emails and hyperlinks, some networking systems use a messaging application to facilitate immediate communication between merchants or advertisers and users about information related to a digital advertisement. But messaging-application volumes may overwhelm a merchant or advertiser's representatives with an excessive number of inquiries. For example, a messaging application by itself often cannot facilitate a merchant or advertiser's workforce to promptly address hundreds or thousands of inquiries during peak volumes on some networking systems, where the volume of inquires can be unpredictable.

Accordingly, conventional digital-communication techniques provide networking systems with limited security, responsiveness, and volume-handling capabilities for user inquiries concerning products or services advertised in a digital advertisement.

SUMMARY

This disclosure describes one or more embodiments of systems and methods that solve some or all the foregoing problems in addition to other benefits. To solve these and other problems, the disclosed systems and methods generate and train a chatbot to automatically communicate with users concerning subjects related to a digital advertisement received for distribution. In particular, the disclosed systems and methods train a chatbot to simulate common conversation exchanges from messaging threads associated with previous digital advertisements that are similar to a received digital advertisement. By training the chatbot to simulate such conversations, the disclosed systems and methods create a chatbot that can immediately respond to a user's inquiries concerning the received digital advertisement and tailor automated exchanges that further the objectives of an advertiser or merchant associated with the received digital advertisement.

For instance, in some embodiments, the systems and methods receive and analyze a digital advertisement to determine characteristics associated with the received digital advertisement. The systems and methods then identify digital advertisements similar to the received digital advertisement and analyze messaging threads associated with the similar digital advertisements. As part of this analysis, the systems and methods identify common conversation exchanges associated with the messaging threads of the similar digital advertisements. Based on these common conversation exchanges, the disclosed systems and methods collect data related to the received digital advertisement to simulate the common conversation exchanges. The disclosed systems and methods then use the common conversation exchanges and the collected data to train a chatbot to automatically communicate with users in automated conversation exchanges related to the received digital advertisement.

By custom training a chatbot for a received digital advertisement, the disclosed systems and methods generate a chatbot that is both unique to a digital advertisement and designed to attain an advertiser's objectives. The systems and methods likewise automate exchanges within messaging threads for the received digital advertisements with immediate responses to users' inquiries—while handling traffic volumes unique to a sophisticated and computerized networking system. But the disclosed systems and methods deliver these immediate and automated responses without the security or volume limitations of conventional digital-communication techniques. The customized chatbot thus provides a faster and more responsive mechanism for responding to network users' inquiries than conventional digital-communication techniques.

The following description sets forth additional features and advantages of one or more embodiments of the disclosed systems and methods. In some cases, such features and advantages will be obvious to a skilled artisan from the description or may be learned by the practice of the disclosed embodiments.

BRIEF DESCRIPTION OF THE DRAWINGS

The detailed description refers to the drawings briefly described below.

DETAILED DESCRIPTION

Figure 1:
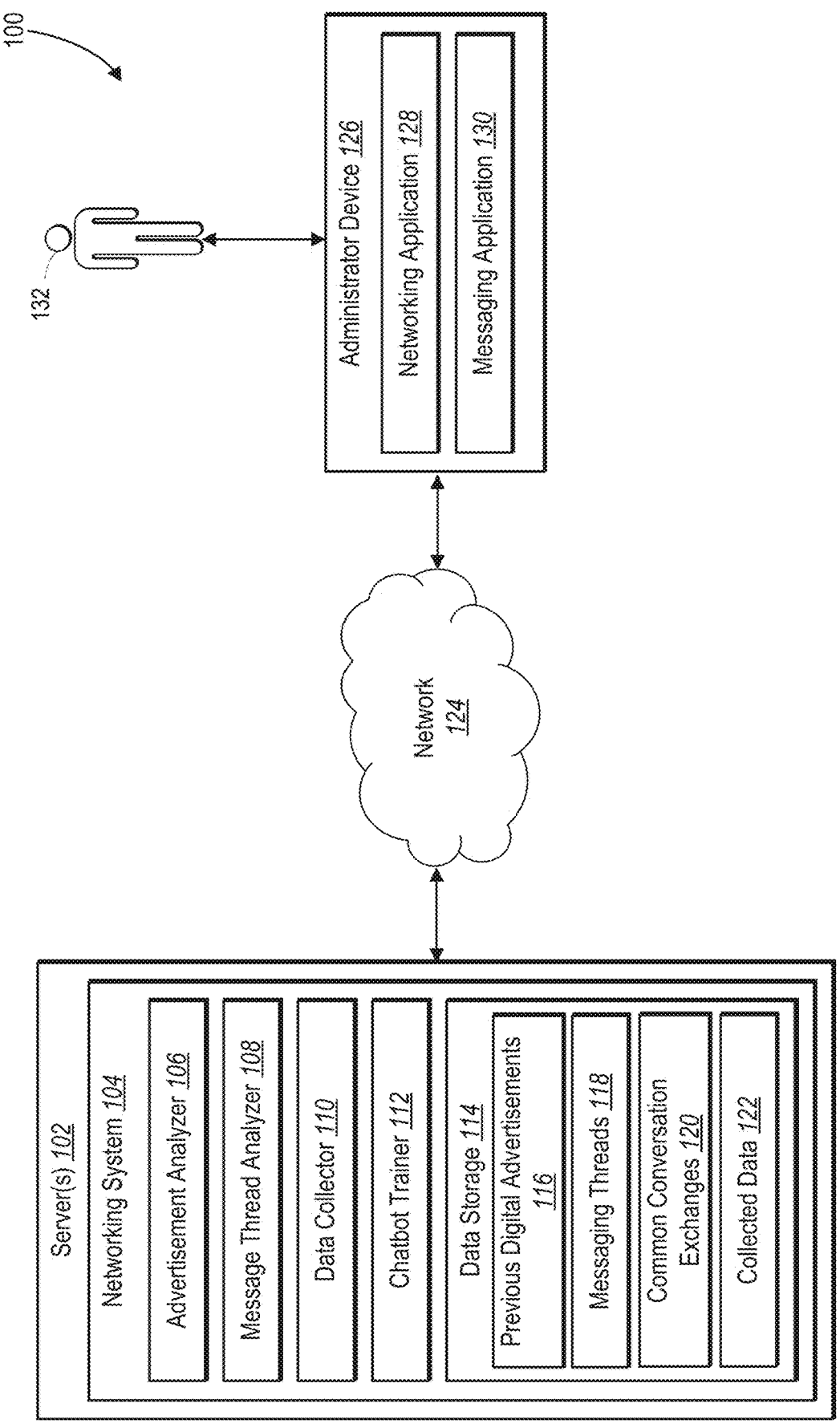
FIG. 1 illustrates a block diagram of an environment for implementing a networking system in accordance with one or more embodiments.

This disclosure describes one or more embodiments of a networking system that generates and trains a chatbot to automatically communicate with users concerning subjects related to a digital advertisement received for distribution. In particular, the networking system trains a chatbot to simulate common conversation exchanges from messaging threads associated with previous digital advertisements that are similar to a received digital advertisement. By training the chatbot to simulate such conversations, the disclosed systems and methods create a chatbot that can immediately respond to a user's inquiries concerning the received digital advertisement and tailor automated exchanges that further the objectives of an advertiser or merchant associated with the received digital advertisement.

For instance, in some embodiments, the networking system receives and analyzes a digital advertisement to determine characteristics associated with the received digital advertisement. The networking system then identifies digital advertisements similar to the received digital advertisement and analyzes messaging threads associated with the similar digital advertisements. As part of this analysis, the networking system identifies common conversation exchanges associated with the messaging threads of the similar digital advertisements. Based on these common conversation exchanges, the networking system collects data related to the received digital advertisement to simulate the common conversation exchanges—but to produce automated conversations associated with the received digital advertisement. The networking system then uses the common conversation exchanges and the collected data to train a chatbot to automatically communicate with users in automated conversation exchanges related to the received digital advertisement.

When identifying similar digital advertisements, the networking system optionally compares characteristics of the received digital advertisement to characteristics of previous digital advertisements. For example, the networking system may compare an advertising category designated for the received digital advertisement to an advertising category designated for one of the previous digital advertisements. The networking system then uses characteristics shared between the received digital advertisement and the previous digital advertisements to generate similarity scores. Each such similarity score represents a similarity between the received digital advertisement and one of the previous digital advertisements. The networking system optionally uses these similarity scores to identify similar digital advertisements and, in turn, accesses messaging threads associated with the similar digital advertisements.

Having accessed messaging threads associated with the similar digital advertisements, in some embodiments, the networking system applies natural language processing to the messaging threads to identify common conversation exchanges. By analyzing various inputs and responses within the messaging threads, the networking system optionally determines that certain common inputs have a shared intent and, in some instances, that certain common responses to those common inputs also have a shared intent. In some such embodiments, the networking system determines which of the common inputs and common responses facilitate attaining one or more objectives of an advertiser, such as inputs and responses that facilitate a purchase of a product or service advertised by the received digital advertisement. The networking system then identifies either or both of the common inputs and the common responses as part of the common conversation exchanges associated with similar digital advertisements.

When collecting data to simulate common conversation exchanges, the networking system optionally collects data from various sources related to either the received digital advertisement or to an advertiser associated with the received digital advertisement. To name but a few examples, in some embodiments, the networking system collects data from contents of the received digital advertisement, from previous digital advertisements of the advertiser, or from webpages of the advertiser. When these sources prove insufficient to simulate common conversation exchanges, the networking system optionally prompts the advertiser to provide some or all of the missing information needed to simulate the common conversation exchanges in automated conversations associated with the received digital advertisement.

As noted above, the networking system uses common conversation exchanges and collected data to train a chatbot to automatically communicate with users in automated conversation exchanges. When doing so, the networking system optionally trains the chatbot to generate predetermined inputs and predetermined responses to send as part of various automated conversation exchanges with users. Additionally or alternatively, in certain embodiments, the networking system trains the chatbot to customize inputs and responses during automated conversation exchanges. Accordingly, in one or more embodiments, the networking system trains a chatbot to send inputs and responses during an automated conversation exchange.

In addition to training the chatbot, in some embodiments, the networking system also provides a preview of the chatbot to an advertiser associated with the received digital advertisement. For example, in certain embodiments, the networking system provides sample input and sample responses for potential automated conversation exchanges. Additionally, in some cases, the networking system provides a chatbot user interface that previews the chatbot automatically communicating with users concerning subjects related to the received digital advertisement.

By custom training a chatbot for a received digital advertisement, the networking system generates a chatbot that is both unique to a digital advertisement and designed to attain an advertiser's objectives. The networking system likewise trains the chatbot to automate immediate exchanges within messaging threads for the received digital advertisements while handling traffic volumes unique to a sophisticated and computerized networking system. But the disclosed networking system delivers these immediate and automated responses without the security or volume limitations of conventional digital-communication techniques. The trained and customized chatbot thus provides a faster and more responsive mechanism for responding to network users' inquiries than conventional digital-communication techniques.

In some embodiments, the networking system likewise trains the chatbot to be more flexible and objective-oriented than existing chatbots. Some chatbots are currently trained to automatically converse with users, but lack the customization to respond to detailed inquiries concerning certain topics related to a digital advertisement. Accordingly, existing chatbots frequently hand off a conversation to a human representative to continue conversations about detailed topics. By contrast, the disclosed networking system trains the chatbot to be more flexible than existing chatbots by engaging in nuanced automated conversation exchanges concerning subjects related to a received digital advertisement. To attain that flexibility, the disclosed networking system identifies digital advertisements similar to a received digital advertisement and identifies common conversation exchanges associated with those similar digital advertisements. By using these common conversation exchanges, the networking system can train the chatbot to engage in conversation topics related to a received digital advertisement that existing chatbots cannot handle and prompt users for nuanced information that existing chatbots do not process.

Turning now to the figures, FIG. 1 provides an overview of an environment in which a networking system can operate and an example architecture for the networking system. Specifically, FIG. 1 illustrates a block diagram of an embodiment of a system environment 100 in which a networking system 104 operates. As illustrated in FIG. 1, the system environment 100 includes server(s) 102, which in turn include the networking system 104. The system environment 100 further includes an administrator device 126.

As depicted in FIG. 1, the administrator device 126 is associated with an administrator 132. Administrators may be humans, organizations, organization members, or any other entities. Additionally, the administrator may represent an advertiser or a merchant. This disclosure primarily refers to administrators as representatives of an advertiser or merchant associated with a digital advertisement. This disclosure also uses the terms "advertiser" and "merchant" interchangeably. Accordingly, the term "advertiser" includes a merchant who directly advertises through or directly sends a digital advertisement to the networking system 104, as well as merchants who use a third-party advertiser to advertise or send an advertisement to the networking system 104. Although FIG. 1 illustrates a single administrator device 126 and a single associated administrator 132, the system environment 100 may include any number of administrator devices and any number of administrators.

As used in this disclosure, the term "digital advertisement" refers to any marketing media for digital display on a computing device. For example, a digital advertisement may comprise a digital image or digital video posted with accompanying text on a profile page (e.g., of a merchant) or a newsfeed (e.g., of a user) of the networking system 104. As another example, a digital advertisement may comprise a digital image or digital video displayed within a webpage of a merchant's website.

As illustrated in FIG. 1, the administrator device 126 can communicate with the server(s) 102, including the networking system 104, over a network 124. Additional details related to the networking system 104 are discussed below with reference to FIGS. 10-11. The network 124 may represent a network or collection of networks, such as the Internet, a corporate intranet, a local area network ("LAN"), or a combination of two or more such networks. While the network 124 may be the Internet or a LAN, the network 124 may also be any suitable network over which the administrator device 126 (or other components) may access the networking system 104 or vice versa, as described further below with reference to FIG. 10.

Generally, the administrator device 126 can include any one of various types of client devices. For example, the administrator device 126 can include a mobile device (e.g., a smart phone), tablet, laptop computer, desktop computer, television, or any other type of computing device as further explained below with reference to FIG. 9. Additionally, the server(s) 102 likewise can include one or more computing devices, including those explained below with reference to FIG. 9. The server(s) 102, networking system 104, network 124, and administrator device 126 may communicate using any communication platforms and technologies suitable for transporting data and/or communication signals, including any known communication technologies, devices, media, and protocols supportive of data communications, examples of which are described below with reference to FIG. 10.

As described below, the server(s) 102 can enable the various functions, features, processes, methods, and systems described herein for training a chatbot specific to a received digital advertisement using the networking system 104, such as the acts described with reference to FIGS. 2A-2C. Additionally or alternatively, the server(s) 102 coordinate with the administrator device 126 to perform or provide the various functions, features, processes, methods, and systems for training a chatbot specific to a received digital advertisement, such as those described below with reference to FIGS. 2A-2C. Although FIG. 1 illustrates a particular arrangement of the server(s) 102, networking system 104, network 124, and administrator device 126, various additional arrangements are possible. For example, the networking system 104 and the server(s) 102 may directly communicate with the administrator device 126 and thus bypass the network 124.

Alternatively, the administrator device 126 communicates with the networking system 104 via dedicated applications on the administrator device 126. In particular, and as further shown in FIG. 1, the administrator device 126 comprises a networking application 128 and a messaging application 130. Among other things, the networking application 128 provides tools for an advertiser to send a digital advertisement to the networking system 104 and forms for an advertiser to provide information concerning the digital advertisement to the networking system 104. By contrast, the messaging application 130 facilitates direct messaging between the administrator 132 and another user of the networking system 104 or between the administrator 132 and the networking system 104, such as when the networking system 104 provides a preview of a trained chatbot to the administrator device 126. Although FIG. 1 depicts the networking application 128 and the messaging application 130 as separate applications, in an alternative embodiment, the messaging application 130 is part of the networking application 128 or vice versa.

In some embodiments, the networking application 128 and the messaging application 130 comprise web browsers, applets, or other software applications (e.g., native applications) available to the administrator device 126. The administrator device 126 may launch the networking application 128 or the messaging application 130 to facilitate interacting with the networking system 104. For example, the networking application 128 may coordinate communications between the administrator device 126 and the server(s) 102 to, for example, access webpages of the networking system 104 or send digital communications within the networking system 104.

To facilitate user interaction with the networking system 104, the networking application 128 and the messaging application 130 can each provide a graphical user interface of the networking system 104; receive indications of interactions between the administrator 132 and the graphical user interface; and perform various requests, queries, or respond to other user input. For example, based on receiving an indication of an interaction between the administrator 132 and the graphical user interface of the networking application 128, the administrator device 126 sends a digital advertisement to the networking system 104 for providing to certain users of the networking system 104. Additionally, in some embodiments, based on receiving an indication of an input interaction between the administrator 132 and the graphical user interface of the messaging application 130, the administrator device 126 sends an input to a trained chatbot of the networking system 104 as part of a preview of the chatbot's functionality.

As an overview of the system environment 100, the server(s) 102 provide the administrator device 126 access to the networking system 104 through the network 124. In one or more embodiments, when accessing the networking system 104, the administrator device 126 sends one or more digital advertisements to the networking system 104, such as a digital advertisement for delivery to various users of the networking system 104. In some embodiments, upon receipt of the digital advertisements, the networking system 104 uses various components to analyze the digital advertisements and train chatbots for each digital advertisement to automatically communicate with users of the networking system 104 concerning subjects related to the received digital advertisements.

As shown in FIG. 1, the networking system 104 includes, but is not limited to, an advertisement analyzer 106, a message thread analyzer 108, a data collector 110, a chatbot trainer 112, and a data storage 114. For ease of reference, this disclosure primarily describes the networking system 104—or its component advertisement analyzer 106, message thread analyzer 108, data collector 110, or chatbot trainer 112—as performing certain functions to analyze received digital advertisements and train chatbots to automatically communicate with users of the networking system 104 rather than the server(s) 102 performing those functions. The networking system 104 and its components, however, comprise computer-executable instructions that cause the server(s) 102 to perform the functions described below. Rather than repeatedly describe the relationship between the instructions within the networking system 104 and the server(s) 102, this disclosure will primarily describe the networking system 104 or its components as performing certain acts as a shorthand for that relationship. The following paragraphs describe each of these components in turn.

As further shown in FIG. 1, the advertisement analyzer 106 analyzes digital advertisements received from the administrator device 126 to determine characteristics associated with the received digital advertisements. As used in this disclosure, the term "characteristic" refers to a trait or feature exhibited or associated with a digital advertisement. A characteristic associated with a digital advertisement may be directly or indirectly associated with the digital advertisement. For example, a characteristic of a digital advertisement may be directly associated with the digital advertisement through an advertisement category designated or detected for a digital advertisement, a name for the digital advertisement or for the advertiser or merchant who submitted the digital advertisement to the networking system 104, or a website hyperlinked to the digital advertisement. Moreover, a characteristic of a digital advertisement may be indirectly associated with the digital advertisement through metadata sent with the digital advertisement, such as a networking-profile indicator for an advertiser or merchant that submits a digital advertisement to the networking system 104.

When the advertisement analyzer 106 determines characteristics associated with the received digital advertisements, the advertisement analyzer 106 may, for example, detect entries within a digital form submitted with a digital advertisement to the networking system 104, including, but not limited to, entries in fields for an advertisement name, text for a digital advertisement, a category designated for a digital advertisement, and a destination Uniform Resource Locator ("URL") hyperlinked to a digital advertisement. In some embodiments, the entries within each such field comprise a characteristic associated with a received digital advertisement. Additionally, in certain embodiments, the advertisement analyzer 106 applies object detection techniques and natural language processing ("NLP") to detect objects within digital images and words or phrases associated a received digital advertisement, respectively. In some such embodiments, the detected objects and words or phrases also comprise characteristics associated with a received digital advertisement.

In addition to determining characteristics associated with a received digital advertisement, the advertisement analyzer 106 analyzes previous digital advertisements distributed within the networking system 104. The advertisement analyzer 106 analyzes the digital advertisements to detect and compare the characteristics of both the received digital advertisement and the previous digital advertisements. For example, in some embodiments, the advertisement analyzer 106 compares characteristics of the received digital advertisement and the previous digital advertisements to identify shared characteristics. In some such embodiments, for instance, the advertisement analyzer 106 compares and identifies commonly designated advertisement categories for digital advertisements and (optionally) other characteristics to categorize the received digital advertisement and the previous digital advertisement into advertisement categories.

Using the shared characteristics, in some embodiments, the advertisement analyzer 106 generates similarity scores for each of the previous digital advertisements. Each similarity score represents a similarity between the received digital advertisement and one of the previous digital advertisements. For example, in some embodiments, the advertisement analyzer 106 generates an affinity coefficient as a similarity score that quantifies an affinity between a received digital advertisement and a previous digital advertisement as objects within a social graph. This disclosure describes affinity coefficients in more detail with reference to FIG. 2A and FIG. 11. Ultimately, the advertisement analyzer 106 identifies previous digital advertisements with similarity scores above a threshold as similar digital advertisements.

As used in this disclosure, the term "similar digital advertisement" refers to a previous digital advertisement that shares one or more characteristics with a received digital advertisement. As noted in the example above, in some embodiments, a similar digital advertisement may be identified based on a similarity score above a threshold. Additionally or alternatively, in certain embodiments, a similar digital advertisement may be identified based on advertisement categories designated for a previous digital advertisement and a received digital advertisement.

As shown in FIG. 1, in addition to the advertisement analyzer 106, the networking system 104 further includes the message thread analyzer 108. The message thread analyzer 108 analyzes messaging threads associated with similar digital advertisements. As used in this disclosure, the term "messaging thread" refers to an exchange of digital messages between two or more users of the networking system 104. Accordingly, a messaging thread includes at least one input and one response between users, although a single messaging thread commonly includes multiple inputs and responses between users. A messaging thread may comprise, for example, an exchange of inputs and responses between a merchant and another user of the networking system 104 concerning subjects related to a previous digital advertisement. A skilled artisan will note that for purposes of this disclosure, in some embodiments, a chatbot may constitute a user of the networking system 104 when analyzing messaging threads.

After the advertisement analyzer 106 identifies similar digital advertisements, in certain embodiments, the message thread analyzer 108 analyzes the messaging threads associated with similar digital advertisements. For example, the message thread analyzer 108 optionally identifies messaging threads that the networking system 104 has tagged with metadata that associates the messaging threads with the identified similar digital advertisements. In some instances, the message thread analyzer 108 applies NLP to the inputs and responses within the messaging threads to determine an intent of each input and each response.

Having identified the intent of the inputs and responses, in some embodiments, the message thread analyzer 108 identifies one or more of common inputs and common responses within the messaging threads. For example, the message thread analyzer 108 optionally applies intent analysis to determine that common inputs and common responses both have shared intents and exceed commonality thresholds representing a threshold measurement of input or response occurrences within the messaging threads. The message thread analyzer 108 identifies one or both of these common inputs and common responses as part of the common conversation exchanges within the messaging threads.

As used in this disclosure, the term "common conversation exchange" refers to a repeated exchange of an input and one or more corresponding responses within messaging threads where either or both of the inputs and responses express a same or similar idea. A common conversation exchange need not (and often does not) comprise identical inputs and responses within different messaging threads. Rather, a common conversation exchange may comprise a repeated input that expresses a same idea in different words and one or more corresponding responses. For example, a first input of "Which model do you prefer?" and a first response of "A 4G Plus"—along with a second input of "Which version are you looking for?" and a second response of "A 600XT"—may comprise a common conversation exchange. As noted above, in some embodiments, the message thread analyzer 108 determines that a repeated exchange is a common conversation exchange only when one or both of the common inputs and common responses exceed a threshold measurement of input or response occurrences within identified messaging threads.

Relatedly, the term "input" refers to a communication within a messaging thread. In some instances, an input includes a question or statement to another user of the networking system 104. An input does not necessarily respond to another input, but may initiate a messaging thread or introduce new ideas or thoughts into a messaging thread. By contrast, the term "response" refers to a communication that responds to an input within a messaging thread. For example, a response may include an answer to an input or statement reacting to an input.

The term "common input" refers to a repeated input within messaging threads that expresses a same or similar idea. Conversely, the term "common response" refers to a repeated response within messaging threads that expresses a same or similar idea. For example, a common input may comprise a repeated input within messaging threads associated with similar digital advertisements that share a same intent, such as a first input of "Which model do you prefer?" and a second input of "Which version are you looking for?" As another example, a common response may comprise a repeated response within messaging threads associated with similar digital advertisements that share a same intent, such as a first response of "A Model T" and a second response of "Version 2.7."

As further shown in FIG. 1, in addition to the message thread analyzer 108, the networking system 104 further includes the data collector 110. The data collector 110 collects data related to a received digital advertisement. When doing so, the data collector 110 identifies and collects data needed to simulate the common conversation exchanges, such as words, phrases, quantities, or other information that are associated with the received digital advertisement and that correspond to common inputs and/or common responses of the common conversation exchanges. For example, in one or embodiments, the data collector 110 may identify models of an automobile advertised in a received digital advertisement from a webpage of an advertiser. The data collector 110 identifies such models to enable a chatbot to simulate a common conversation exchange repeated in messaging threads of similar digital advertisements featuring similar automobiles. The data collector 110 collects such data from various sources, including, but not limited to, the contents of the received digital advertisement, previous digital advertisements of an advertiser, webpages of the advertiser, a networking profile of the advertiser, a product catalogue (e.g., from the networking system 104), or a digital form filled out by the advertiser.

After aggregating the data, in some embodiments, the data collector 110 may determine that the aggregated data does not include certain missing information required to simulate the common conversation exchanges. To remedy that lack of information, in certain instances, the data collector 110 prompts an advertiser associated with a received digital advertisement to provide the missing information. This prompt may be sent, for example, to the administrator device 126 for display within the networking application 128. As described below, the data collector 110 may prompt the advertiser for the missing information in a digital form or in a variety of other ways, such as in a messaging thread.

As also shown in FIG. 1, in addition to the data collector 110, the networking system 104 includes the chatbot trainer 112. The chatbot trainer 112 trains the chatbot to automatically communicate with users in automated conversation exchanges related to a received digital advertisement. In training the chatbot, the chatbot trainer 112 uses the common conversation exchanges and the collected data related to the received digital advertisement. For example, in some embodiments, the chatbot trainer 112 uses an artificial-intelligence platform to train the chatbot to simulate common conversation exchanges using collected data, such as Facebook's Wit.ai platform. Regardless of the training tools used, the chatbot trainer 112 optionally trains the chatbot to generate predetermined inputs and predetermined responses to send as part of automated conversation exchanges with users. In addition or in the alternative, in certain embodiments, the chatbot trainer 112 trains the chatbot to customize inputs and customizes responses during automated conversation exchanges with users.

Beyond training the chatbot, the chatbot trainer 112 optionally provides a preview of the chatbot. For example, in certain embodiments, the chatbot trainer 112 provides an advertiser sample input and sample responses for potential automated conversation exchanges. The chatbot trainer 112 likewise includes selectable options for an advertiser to edit sample inputs or sample responses. Additionally, in some embodiments, the chatbot trainer 112 provides a chatbot user interface as a preview of how the chatbot automatically communicates with users concerning subjects related to the received digital advertisement. The chatbot user interface enables an advertiser to test the chatbot with inputs and responses, as well as edit any inputs and responses from the chatbot for retraining. Based on any edits received for a sample or previewed input or response, the chatbot trainer 112 optionally retrains the chatbot.

In addition to the chatbot trainer 112, the networking system 104 includes the data storage 114. The data storage 114 optionally maintains previous digital advertisements 116, messaging threads 118, common conversation exchanges 120, and collected data 122. In one or more embodiments, the advertisement analyzer 106 accesses the previous digital advertisements 116 when comparing the previous digital advertisements 116 to a received digital advertisement and identifying similar digital advertisements. Additionally, in some embodiments, the message thread analyzer 108 accesses the messaging threads 118 to identify common conversation exchanges. Upon identifying such common conversation exchanges, the messaging thread analyzer 108 instructs the server(s) 102 to store the common conversation exchanges 120 within the data storage 114. In some such embodiments, the data storage 114 organizes the common conversation exchanges 120 by received digital advertisement or according to each analysis of common conversation exchanges for a received digital advertisement. Finally, in some instances, the data collector 110 instructs the server(s) 102 to store the collected data 122 within the data storage 114 and optionally organizes the collected data 122 by received digital advertisement.

Figure 2A:
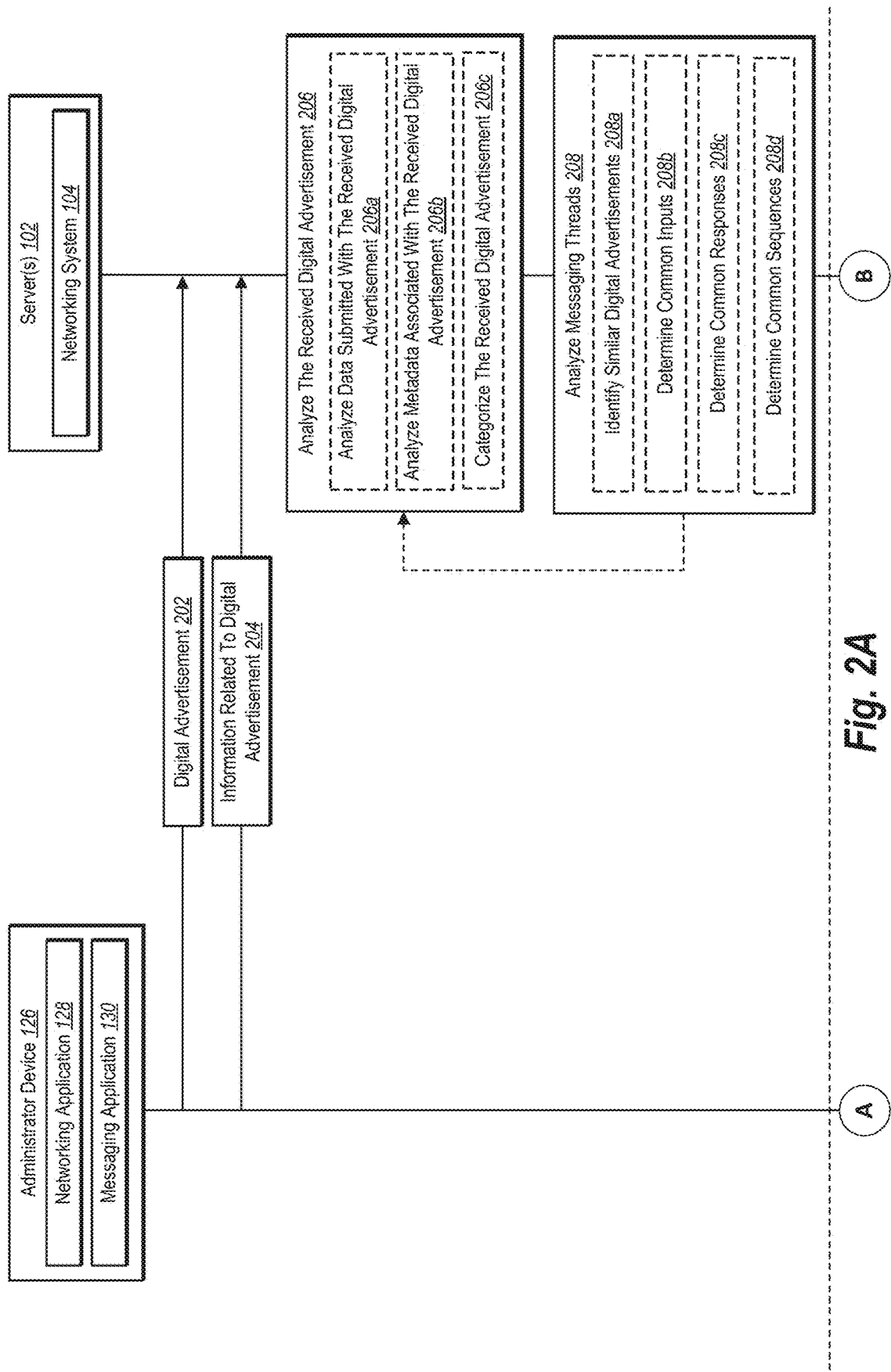
FIGS. 2A-2C illustrate a sequence-flow diagram of training a chatbot to automatically communicate with users concerning subjects related to a received digital advertisement in accordance with one or more embodiments.
Figure 2B:
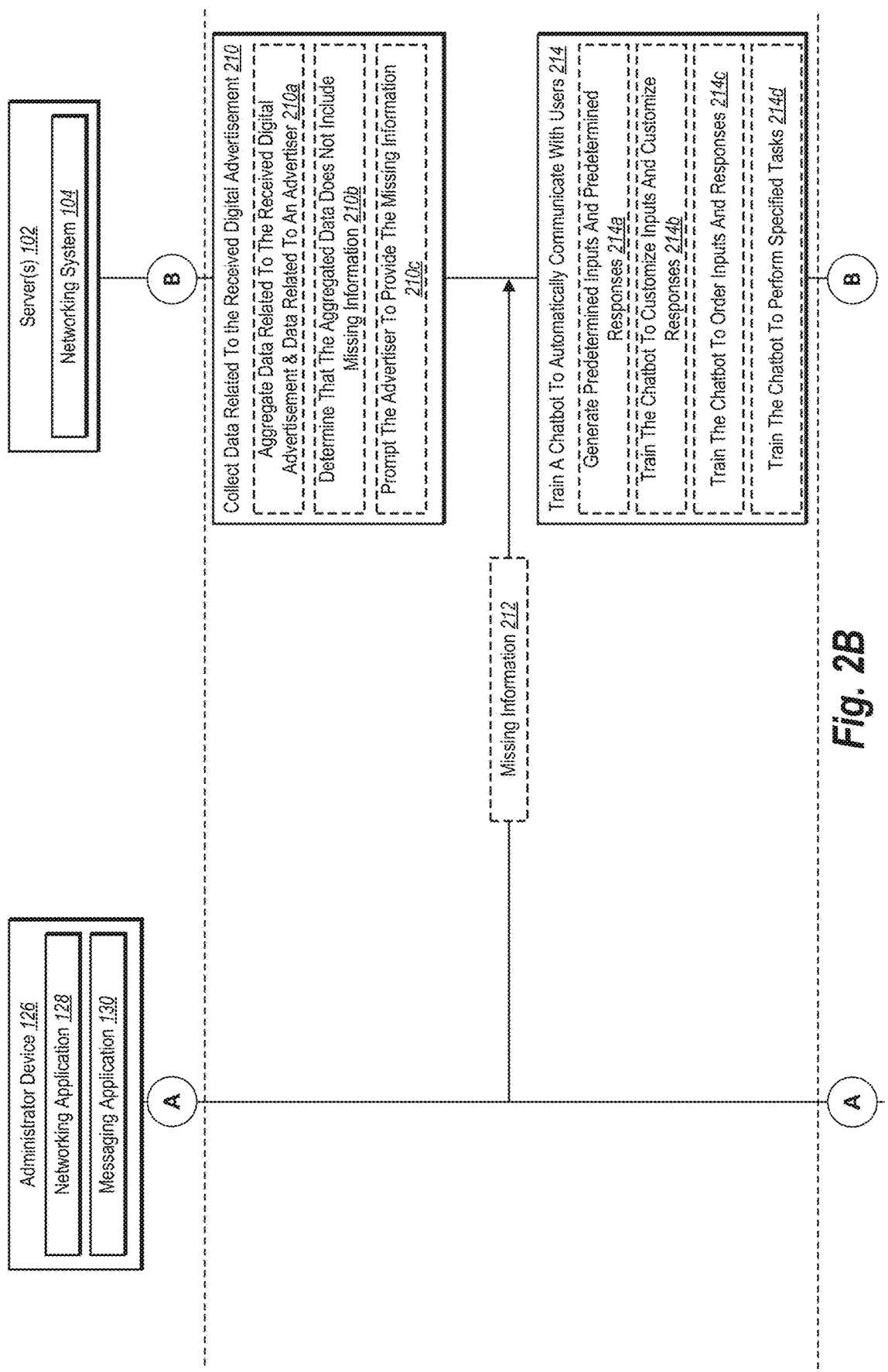
Figure 2C:
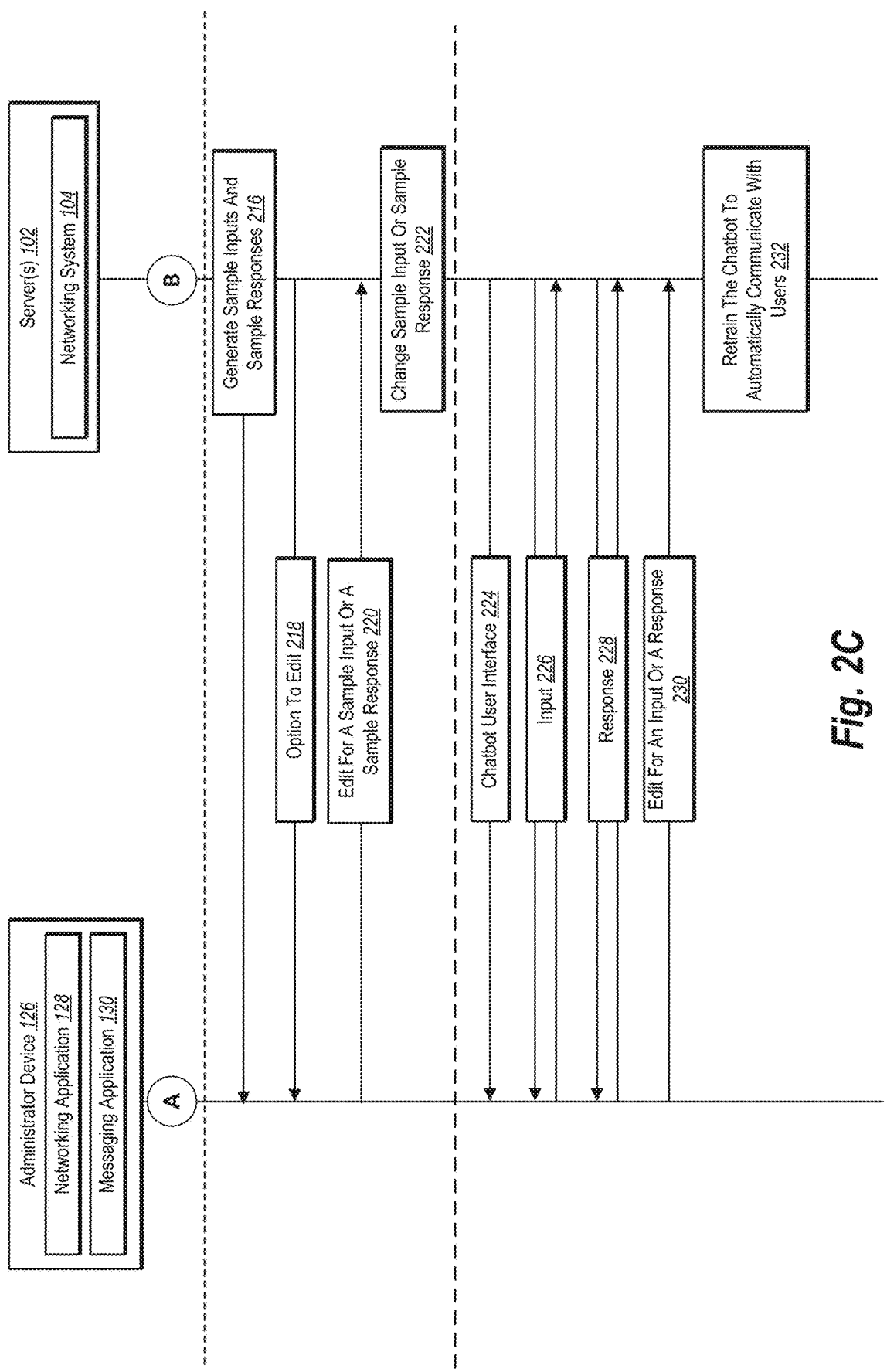

Turning now to FIGS. 2A-2C, these figures provide an overview of embodiments of the networking system 104 that analyze received digital advertisements and train chatbots to automatically communicate with users of the networking system 104 concerning subjects related to the received digital advertisement. Specifically, FIGS. 2A-2C illustrate a representation of a sequence of acts 202-232 that the server(s) 102 or the administrator device 126 perform to, among other things, analyze received digital advertisements, analyze messaging threads of similar digital advertisements, and train chatbots to automatically communicate with users of the networking system 104 concerning subjects related to the received digital advertisement. In some embodiments, the networking system 104 comprises computer-executable instructions that cause the server(s) 102 to perform one or more of the acts 202-232 shown in FIGS. 2A-2C. Similarly, in certain embodiments, the networking application 128 and the messaging application 130 comprise computer-executable instructions that cause the administrator device 126 to perform one or more of the acts 202-232 shown in FIGS. 2A-2C.

As above, rather than repeatedly describe the relationship between the instructions within the networking system 104 and the server(s) 102—or the relationship between the instructions within the networking application 128 or the messaging application 130 and the administrator device 126—the disclosure will primarily describe the networking system 104 or the administrator device 126 as performing the acts 202-232 as a shorthand for those relationships. Additionally, while the paragraphs below often describe the acts 202-232 in relation to a single received digital advertisement, a single set of similar digital advertisements, and the networking system 104, certain embodiments of the acts 202-232 involve multiple received digital advertisements, multiple sets of similar digital advertisements, and potentially any interface for a software application, website, or webpage instead of the networking system 104, such as a merchant's mobile application or website.

Figure 3:
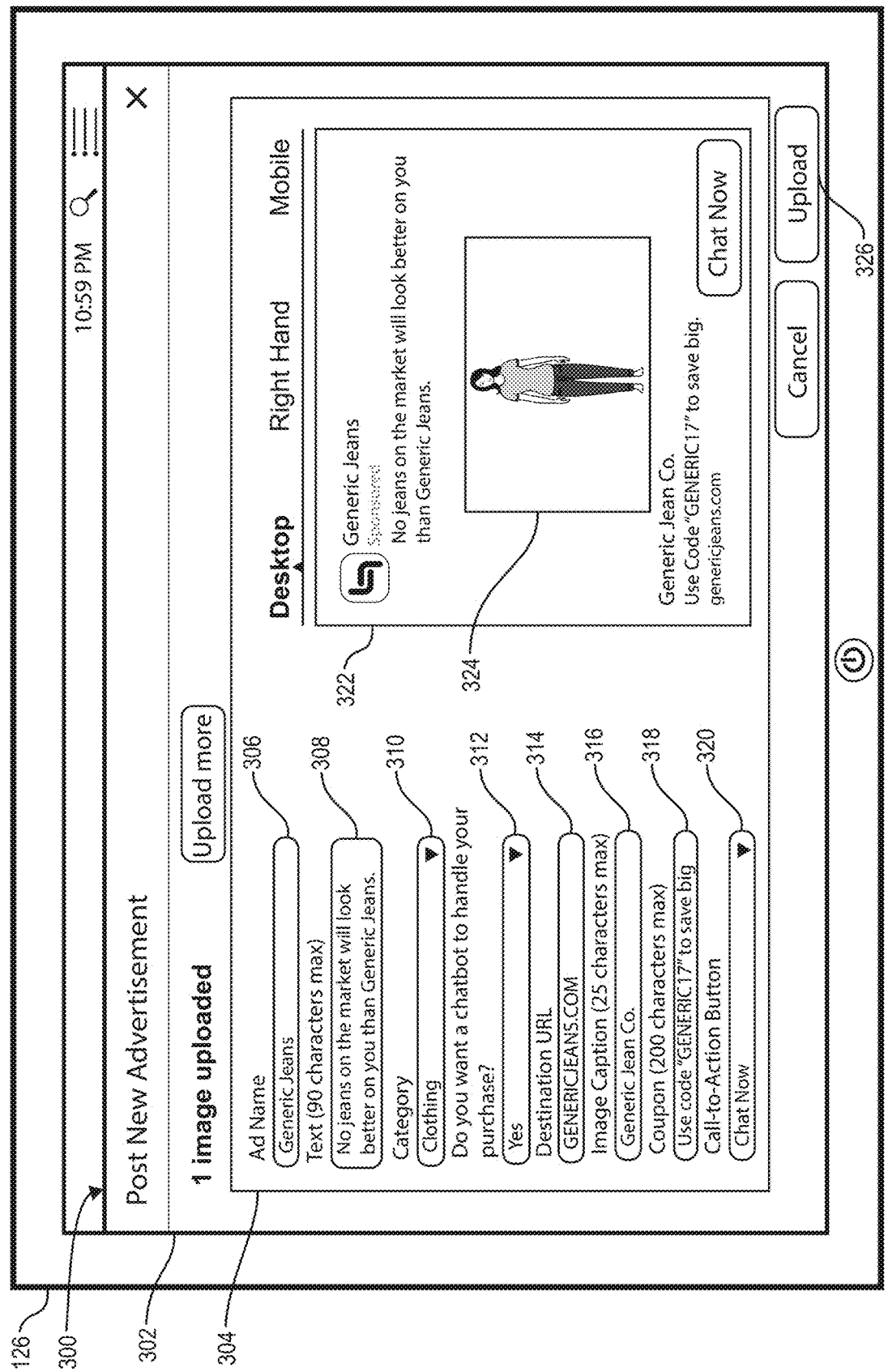
FIG. 3 illustrates a graphical user interface for creating a digital advertisement for a networking system in accordance with one or more embodiments.

Turning back now to the acts 202-232, as shown in FIG. 2A, the administrator device 126 optionally performs the act 202 of sending a digital advertisement to the networking system 104. Conversely, the networking system 104 receives the digital advertisement from the administrator device 126. For example, the administrator device 126 may send a digital image or digital video with accompanying audio, icons, or text to the networking system 104 for display within a timeline, newsfeed, messaging application, networking application, or webpage of the networking system 104. Alternatively, the administrator device 126 may send a digital file comprising an augmented-reality or virtual-reality display as a digital advertisement associated with the networking system 104. In some embodiments, the networking system 104 receives a digital advertisement as the administrator 132 creates the digital advertisement using tools of a digital submission form. As described below, FIG. 3 provides an example of one such digital submission form through which the networking system 104 receives the digital advertisement. In the following paragraphs, this disclosure often describes such digital advertisements received by the networking system 104 as received digital advertisements.

In addition to sending a digital advertisement, the administrator device 126 optionally performs the act 204 of sending information related to the digital advertisement to the networking system 104. The networking system 104 in turn receives the information related to the digital advertisement from the administrator device 126. For example, the administrator device 126 may send information related to the digital advertisement as part of a digital form, such as a digital submission form for a digital advertisement. Such information may include, but is not limited to, entries in a digital form's fields for an advertisement name, text to accompany a digital advertisement, a category designated for a digital advertisement, a destination URL hyperlinked to a digital advertisement, digital coupons or digital-coupon codes associated with the digital advertisement, a description of products or services advertised by the digital advertisement, or pricing information for products or services advertised by the digital advertisement. In some embodiments, the administrator device 126 sends metadata associated with the digital advertisement as part of the information related to the digital advertisement. The metadata associated with the digital advertisement may include, but is not limited to, an account-profile identifier, an advertiser or merchant's name, an Internet Protocol ("IP") address, or a geographic location associated with the administrator device 126.

After the networking system 104 receives the digital advertisement and the information related to the digital advertisement, the networking system 104 performs the act 206 of analyzing the received digital advertisement. When performing the act 206, the networking system 104 analyzes the received digital advertisement to determine characteristics associated with the received digital advertisement. As shown in FIG. 2A, for example, the networking system 104 determines characteristics associated with the received digital advertisement by optionally performing the act 206a of analyzing data submitted with the received digital advertisement and/or by performing the act 206b of analyzing metadata associated with the received digital advertisement.

When performing the act 206a, for example, the networking system 104 may analyze entries within fields of a digital form submitted with the received digital advertisement. The networking system 104 may also detect any preset options selected within the digital form, such as call-to-action buttons selected and included as part of the received digital advertisement. The networking system 104 may likewise apply NLP to text within the fields of a digital form. The fields may include various information from an advertiser related to the received digital advertisement, including, but not limited to, details and conditions of an offer featured in the received digital advertisement, information of interest to a user concerning the received digital advertisement (e.g., product or service names, pricing, hyperlinks to webpages describing a product or service), qualifications required to qualify for a product or service (e.g., credit ratings score, income level).

Additionally, the networking system 104 may use neural-network architectures that enhance NLP when analyzing text submitted with a digital advertisement, such as Facebook's DeepText that uses neural networks and deep learning to perform word-level and character-level based analysis. In some embodiments, the networking system 104 also applies object detection algorithms to identify objects within an image or video from within the received digital advertisement. When doing so, the networking system 104 may detect products or services featured in an image or video, such as accessories, animals, clothing, devices, food, or people. For example, in some embodiments, the networking system 104 applies some of Facebook's object-detection techniques, including, but not limited to, DeepMask, SharpMask, and MultiPathNet, to detect objects in images or videos. Additionally or alternatively, the networking system 104 applies appearance-based methods of object detection, such as edge matching, divide-and-conquer searching, greyscale matching, gradient matching, histograms of receptive field responses; or feature-based methods of object detection, such as interpretation trees, pose consistency, pose clustering, invariance, Gradient Location and Orientation Histogram ("GLOH"), geometric hashing, Histogram of Oriented Gradients ("HOG"), Phase Stretch Transform ("PST"), Scale-Invariant Feature Transform ("SIFT"), and Speeded Up Robust Features ("SURF"). Regardless of the technique used, the networking system 104 may determine certain characteristics from the data submitted with a received digital advertisement—including, but not limited to, such characteristics as advertisement categories, advertiser or merchant's names, coupons or coupon codes, celebrities or promoters of a product or service, keywords or phrases, objects detected in images or videos, software applications, URLs, or a song or audio file.

Turning back now to FIG. 2A, when performing the act 206b, the networking system 104 analyzes any metadata sent with the received digital advertisement. As noted above, the networking system 104 identifies account-profile identifiers, advertiser or merchant's names, IP addresses, and geographic locations associated with the administrator device 126 from among the metadata associated with the received digital advertisement. Additionally, the networking system 104 may also identify from the metadata a device type or selectable options deleted from or not selected as part of a digital submission form for a digital advertisement. Based on this analysis, the networking system 104 determines certain characteristics from the metadata associated with a received digital advertisement, such as any of the metadata noted above, including, but not limited to, geographic locations, device types, or IP addresses.

In addition to analyzing data submitted with a received digital advertisement or metadata associated with a received digital advertisement, in some embodiments, the networking system 104 performs the act 206c of categorizing the received digital advertisement. As noted above, an advertisement category may be one of the characteristics (or the only characteristic) associated with a received digital advertisement. To categorize a received digital advertisement, the networking system 104 optionally detects an advertisement category designated for the received digital advertisement, such as an advertisement category selected from a menu of options within a digital submission form.

In some embodiments, however, a received digital advertisement may have no advertisement category designated. Relatedly, in some embodiments, the networking system 104 implements procedures to verify or change an advertisement category designated for a received digital advertisement. Accordingly, in addition or in the alternative to detecting a designated advertisement category, the networking system 104 optionally assigns an advertisement category to the received digital advertisement based on the characteristics determined for the received digital advertisement. In some embodiments, the networking system 104 identifies a minimum set of characteristics—or a minimum number of characteristics from a set of characteristics—for a received digital advertisement to satisfy to be categorized within an advertisement category. Additionally, in some such embodiments, the networking system 104 may categorize a digital advertisement within multiple advertisement categories.

For example, the networking system 104 may categorize any digital advertisement having three or more of the following characteristics as within an advertisement category for automobiles: an automobile detected within an image or video, a merchant or advertiser's name from a list of recognized automobile manufacturers, a hyperlinked webpage from a list of recognized websites for automobile manufacturers, a keyword or keyphrase associated with automobile models, and a keyword or keyphrase from a list of keywords or keyphrases commonly associated with automobiles. The networking system 104 may categorize a received digital advertisement within an advertisement category for automobiles based on satisfying a minimum number of characteristics from the set of characteristics above. Additionally, the networking system 104 may categorize the same received digital advertisements as within an advertisement category for trucks based on satisfying a minimum number of characteristics from a different set of characteristics.

As further shown in FIG. 2A, in addition to analyzing a received digital advertisement, the networking system 104 performs the act 208 of analyzing messaging threads. In particular, the networking system 104 analyzes messaging threads of digital advertisements similar to a received digital advertisement. As noted above, the networking system 104 analyzes such messaging threads to identify common conversation exchanges associated with the messaging threads that it later uses for training a chatbot to automatically converse concerning subjects related to the received digital advertisement.

In some embodiments, the networking system 104 initially performs the act 208*a* of identifying similar digital advertisements. When identifying similar digital advertisements, the networking system 104 optionally identifies previous digital advertisements distributed within the networking system 104 that share a same advertisement category designated with a received digital advertisement. In other words, the networking system 104 optionally uses advertisement categories to identify previous digital advertisements that are similar to a received digital advertisement.

In addition or in the alternative to using advertisement categories, the networking system 104 optionally compares the characteristics associated with a received digital advertisement with characteristics associated with previous digital advertisements. In some such embodiments, the networking system 104 determines characteristics of the previous digital advertisements using the processes and technologies described above for determining characteristics associated with a received digital advertisement. When comparing characteristics, in certain embodiments, the networking system 104 limits comparisons between a received digital advertisement and previous digital advertisements to previous digital advertisements within certain advertisement categories. Moreover, in comparing a received digital advertisement with previous digital advertisements, the networking system 104 identifies shared characteristics between the received digital advertisement and the previous digital advertisement. In other words, the networking system 104 identifies any characteristics associated with a received digital advertisement that are also associated with one of the previous digital advertisements.

After comparing characteristics, the networking system 104 optionally uses the shared characteristics to generate a similarity score for each of the previous digital advertisements or each of the previous digital advertisements within certain advertisement categories. As noted above, each similarity score represents a similarity between a received digital advertisement and one of the previous digital advertisements. For example, in some embodiments, the advertisement analyzer 106 generates or utilizes an affinity coefficient in calculating a similarity score that quantifies an affinity between a received digital advertisement and a previous digital advertisement—both of which are represented as objects within a social graph. For example, in some such embodiments, the networking system 104 represents each digital advertisement as a node within a social graph. The networking system 104 likewise represents various characteristics associated with each digital advertisement as nodes within the social graph and connections between the characteristics and the nodes as edges within the social graph. By using these nodes and edges, the networking system 104 generates an affinity coefficient as a similarity score for each pair of a received digital advertisement and a previous digital advertisement. This disclosure describes affinity coefficients in more detail with reference to FIG. 11 below.

Alternatively, the networking system 104 generates a similarity score between a received digital advertisement and one of the previous digital advertisements as a function of shared characteristics. For example, in some embodiments, the networking system 104 generates a similarity score by assigning a quantity and a weight to each shared characteristic between a received digital advertisement and one of the previous digital advertisements. The networking system 104 then calculates a product or a sum of the weighted quantities.

For example, the networking system 104 may assign a quantity of one for each shared characteristic between digital advertisements and different weights depending on an importance of the characteristic. In particular, the networking system 104 may assign a quantity of one to each of the following shared characteristics associated with both a received digital advertisement and a first previous digital advertisement: a merchant's name, a hyperlinked website, and an object detected within images. Similarly, the networking system 104 may assign a quantity of one to each of the following shared characteristics associated with both the received digital advertisement and a second previous digital advertisement: a keyword, an advertisement category, and an object detected within images.

Continuing this example, the networking system 104 may assign a weight of 0.70 to the shared merchant's name, a weight of 0.80 to the shared hyperlinked website, and a weight of 0.45 to the shared object detected within images associated with both the received digital advertisement and the first previous digital advertisement. Similarly, the networking system 104 may assign a weight of 0.20 to the shared keyword, a weight of 0.25 to the shared advertisement category, and a weight of 0.45 to the shared object detected within images associated with both the received digital advertisement and the second previous digital advertisement. By taking the sum of the weighted quantities associated with the shared characteristics between the received digital advertisement and the first and second previous digital advertisements, respectively, the networking system 104 would generate a similarity score of 1.95 for the first previous digital advertisement and a similarity score of 0.90 for the second previous digital advertisement.

While this disclosure describes an affinity coefficient and a weighted-quantity approach to generating similarity scores above, the networking system 104 may use any suitable method of generating similarity scores between a received digital advertisement and previous digital advertisements. Regardless of the method of generating similarity scores, in certain embodiments, the networking system 104 identifies previous digital advertisements having similarity scores above a threshold exclusively as similar digital advertisements. For example, the networking system 104 may use a predetermined threshold for an affinity coefficient or a weighted-quantity score to identify previous digital advertisements as similar digital advertisements. Alternatively, in some embodiments, the networking system 104 dynamically adjusts a threshold for each received digital advertisement to ensure that a sample size of associated messaging threads is sufficient to identify common conversation exchanges.

As suggested above, after identifying similar digital advertisements, the networking system 104 accesses messaging threads associated with the similar digital advertisements. For example, the networking system 104 may access messaging threads within a database of the networking system 104, such as the data storage 114, which includes tags, labels, or other data that identify the messaging threads as associated with the similar digital advertisements. In some embodiments, the networking system 104 attaches tags or metadata to a messaging thread when a user of the networking system 104 initiates a messaging thread—in response to another user of the networking system 104 selecting a previous digital advertisement, viewing a previous digital advertisement, or performing some other interaction with a previous digital advertisement.

After accessing messaging threads associated with the similar digital advertisements, in some embodiments, the networking system 104 analyzes the messaging threads to detect or otherwise understand the content of the messaging threads. For example, the networking system 104 optionally applies NLP to the messaging threads to determine an intent of each input and each response within the messaging threads. In some such embodiments, the networking system 104 applies NLP intent analysis to each input and each response of a messaging thread, such as by using NLP open-source software available from the Stanford Natural Language Processing Group. In addition to determining an intent of each input and response, the networking system 104 optionally determines entities for each word within an input or response and a syntax pattern for each input or response. For example, in some embodiments, the networking system 104 applies Stanford's open-source NLP software to (a) assign parts-of-speech ("POS") tags to each word within an input or response, (b) assign named-entity tags to certain words representing named entities within the inputs or responses, and (c) create POS sequences for each input or response.

Alternatively, in some embodiments, the networking system 104 applies Facebook's DeepText to analyze the contents of the messaging threads. For example, in some instances, the networking system 104 applies DeepText to (a) determine the intent of each input and response, (b) identify syntax patterns within each input and response, and (c) assign entities to each word within an input or response of the messaging threads. In addition to Stanford's open-source NLP software and Facebook's DeepText, some embodiments of the networking system 104 use other suitable NLP software to determine the intent of—and the word entities and syntax patterns within—each input and each response of the messaging threads associated with the similar digital advertisements.

As further shown in FIG. 2A, as part of analyzing messaging threads, the networking system 104 optionally performs the act 208b of determining common inputs. For example, in some embodiments, the networking system 104 identifies repeated inputs within the messaging threads as common inputs when they have a shared intent and exceed a commonality threshold. When identifying repeated inputs, the networking system 104 determines whether repeated inputs have a shared intent based on the intent analysis described above. In some embodiments, the commonality threshold for inputs comprises a number of occurrences for repeated inputs having a same intent from among all inputs or all repeated inputs, a percentage of occurrences for repeated inputs having a same intent from among all inputs or all repeated inputs, or any other suitable measure of common occurrence.

In addition to determining common inputs from among messaging threads associated with similar digital advertisements, the networking system 104 optionally identifies responses that correspond to the common inputs. As suggested above, corresponding responses to a common input may have different intents. For example, a common input of "How can I help you?" may have several different corresponding responses, including corresponding responses ranging from a question of "How much does a model X cost?" to "I'm trying to figure out when this product goes on sale." In some embodiments, the networking system 104 identifies the common inputs and their corresponding responses as one or more of the common conversation exchanges associated with the analyzed messaging threads.

As noted above, in addition to determining common inputs, the networking system 104 sometimes determines common responses. Accordingly, as shown in FIG. 2A, the networking system 104 optionally performs the act 208c of determining common responses. In some embodiments, for example, the networking system 104 identifies repeated responses within the messaging threads that have a shared intent and that exceed a commonality threshold. In some such embodiments, the common responses correspond to common inputs. Moreover, the networking system 104 determines whether repeated responses have a shared intent based on the intent analysis described above. In some embodiments, the commonality threshold for responses comprises a number of occurrences for repeated responses having a same intent from among all responses or all repeated responses, a percentage of occurrences for repeated responses having a same intent from among all responses or all repeated responses, or any other suitable measure of common occurrence. Additionally, in certain embodiments, the networking system 104 identifies the common inputs and their corresponding common responses as one or more of the common conversation exchanges associated with the analyzed messaging threads.

The networking system 104 can not only detect common inputs and responses, but also detect and analyze the order of such common inputs and responses. As further shown in FIG. 2A, the networking system 104 optionally performs the act 208d of determining common sequences. As used in this disclosure, the term "common sequence" refers to a repeated order of inputs or responses among messaging threads. For example, a common sequence may include a repeated set of a common input and corresponding common response in multiple messaging threads. Additionally, in some embodiments, a common sequence may include a repeated common input—regardless of the corresponding responses—among multiple messaging threads.

Similar to determining common inputs and common responses, in some embodiments, the networking system 104 determines common sequences based on a commonality threshold representing a threshold measurement of occurrences of a sequence within the messaging threads. Moreover, the commonality threshold for common sequences optionally comprises a number of occurrences for repeated sequences, a percentage of occurrences for repeated sequences, or any other suitable measure of common occurrence. Additionally, in some embodiments, the networking system 104 determines common sequences from among the common conversation exchanges. Indeed, in some cases, the networking system 104 determines that a common sequence of common inputs and/or common responses is part of the common conversation exchanges.

As shown in FIG. 2A and described above, the networking system 104 performs the act 206 of analyzing the received digital advertisement before the act 208 of analyzing messaging threads. In some embodiments, however, the reverse is true—that is, the networking system 104 performs the act 208 of analyzing messaging threads before the act 206 of analyzing the received digital advertisement. FIG. 2A represents the possibility of reversing the order or looping the order of the acts 206 and 208 with a dotted arrow connecting the two acts. For example, in some embodiments, the networking system 104 analyzes messaging threads associated with similar digital advertisements— except that the similar digital advertisements are similar to each other by category and not necessarily similar to a particular received digital advertisement. In some such embodiments, the networking system 104 optionally performs the acts 208a, 208b, 208c, and 208d, but by using messaging threads associated with previous digital advertisements that are similar by category.

Turning now to FIG. 2B, after analyzing messaging threads of similar digital advertisements and identifying common conversation exchanges, the networking system 104 performs the act 210 of collecting data related to the received digital advertisement. In performing the act 210, the networking system 104 optionally collects information to simulate the common conversation exchanges within automated conversations associated with the received digital advertisement. Accordingly, the networking system 104 seeks to identify word entities and syntax patterns from among various sources related to the received digital advertisement to simulate the common conversation exchanges— but to simulate those exchanges with information related to the received digital advertisement.

As noted about, the networking system 104 collects this data from various sources related to either the received digital advertisement or to an advertiser associated with the received digital advertisement. When performing the act 210, those sources include, but are not limited to, the contents of the received digital advertisement, such as text within fields of a submitted digital form; previous digital advertisements of an advertiser or a merchant associated with the received digital advertisement, such as from messaging threads of the advertiser or merchant or from previously submitted digital forms for previous digital advertisements of the advertiser or merchant; webpages of the advertiser, such as a webpage hyperlinked to the received digital advertisement, a webpage that is hyperlinked to a webpage that is in turn hyperlinked to the received digital advertisement, or a webpage that answers frequently asked questions concerning a product or service featured, described, or shown in the received digital advertisement; a networking profile of the advertiser or merchant, such as a networking profile for an advertiser or merchant associated with the received digital advertisement; a product catalogue, such as a product catalogue within the networking system 104 for an advertiser or merchant associated with the received digital advertisement; or a digital form filled out by the advertiser, such as a digital form submitted with the received digital advertisement.

Consistent with the disclosure above concerning NLP analysis for inputs and responses, the networking system 104 optionally applies NLP to the common inputs, corresponding responses, and/or common responses from within the common conversation exchanges. Based on this NLP analysis, the networking system 104 identifies syntax patterns and word entities among the common inputs, corresponding responses, and/or common responses. The networking system 104 then uses the identified intent for each of the common inputs, corresponding responses, and/or common responses to collect data from various sources related to the received digital advertisement to simulate the common inputs, corresponding responses, and/or common responses—but simulate such inputs and responses with information associated with the received digital advertisement. In other words, the networking system 104 identifies information from sources related to the received digital advertisement to plug in information needed to simulate common conversation exchanges associated with the analyzed messaging threads.

For example, the networking system 104 may identify POS sequences, POS tags, and named-entity tags for each of the common inputs, corresponding responses, and/or common responses. Based on the intent identified for each of the common inputs, corresponding responses, and/or common responses, the networking system 104 collects data from various sources related to the received digital advertisement to simulate the common inputs, corresponding responses, and/or common responses—but with words that relate to the received digital advertisement and that correspond to the identified named-entity tags and POS tags in sentences that follow similar POS sequences. In some embodiments, the networking system 104 uses Facebook's Wit.ai platform to identify the information needed to simulate the common conversation exchanges.

As part of performing the act 210 of collecting data, and as shown in FIG. 2B, the networking system 104 optionally performs the act 210a of aggregating data related to the received digital advertisement and data related to an advertiser associated with the received digital advertisement, as well as the act 210b of determining that the aggregated data does not include missing information. In some such embodiments, for example, the networking system 104 aggregates the data and then maps words, phrases, quantities, or other information collected from the various sources to input templates or response templates for the received digital advertisement to simulate the common conversation exchanges. Such words, phrases, quantities, or other information may correspond, for example, to named entities and POS tags in common inputs, corresponding responses, and/ or common responses. After mapping the words, phrases, quantities, or other information, the networking system 104 may determine that the aggregated data does not include certain missing information required to simulate the common conversation exchanges.

For example, when determining that the aggregated data does not include missing information, the networking system 104 may determine that it cannot find candidate words, phrases, quantities, or other information corresponding to named-entity tags or POS tags to simulate the common conversation exchanges. In other words, the networking system 104 may lack information related to the received digital advertisement to simulate common inputs, corresponding responses, and/or common responses. Alternatively, the networking system 104 may determine that it cannot find certain words, phrases, quantities, or other information corresponding to named-entity tags or POS tags that satisfy a confidence threshold to simulate the common conversation exchanges. For example, the networking system 104 may have analyzed POS sequences or other syntax patterns from the various sources and found competing candidate words, phrases, quantities, or other information corresponding to named-entity tags or POS tags. Based on an empirical number of occurrences, the networking system 104 may determine that its candidate words, phrases, quantities, or other information fall below a confidence threshold. This confidence threshold may be, for example, a percentage of empirical occurrences within a syntax pattern or a number of empirical occurrences within a syntax pattern.

Figure 6:
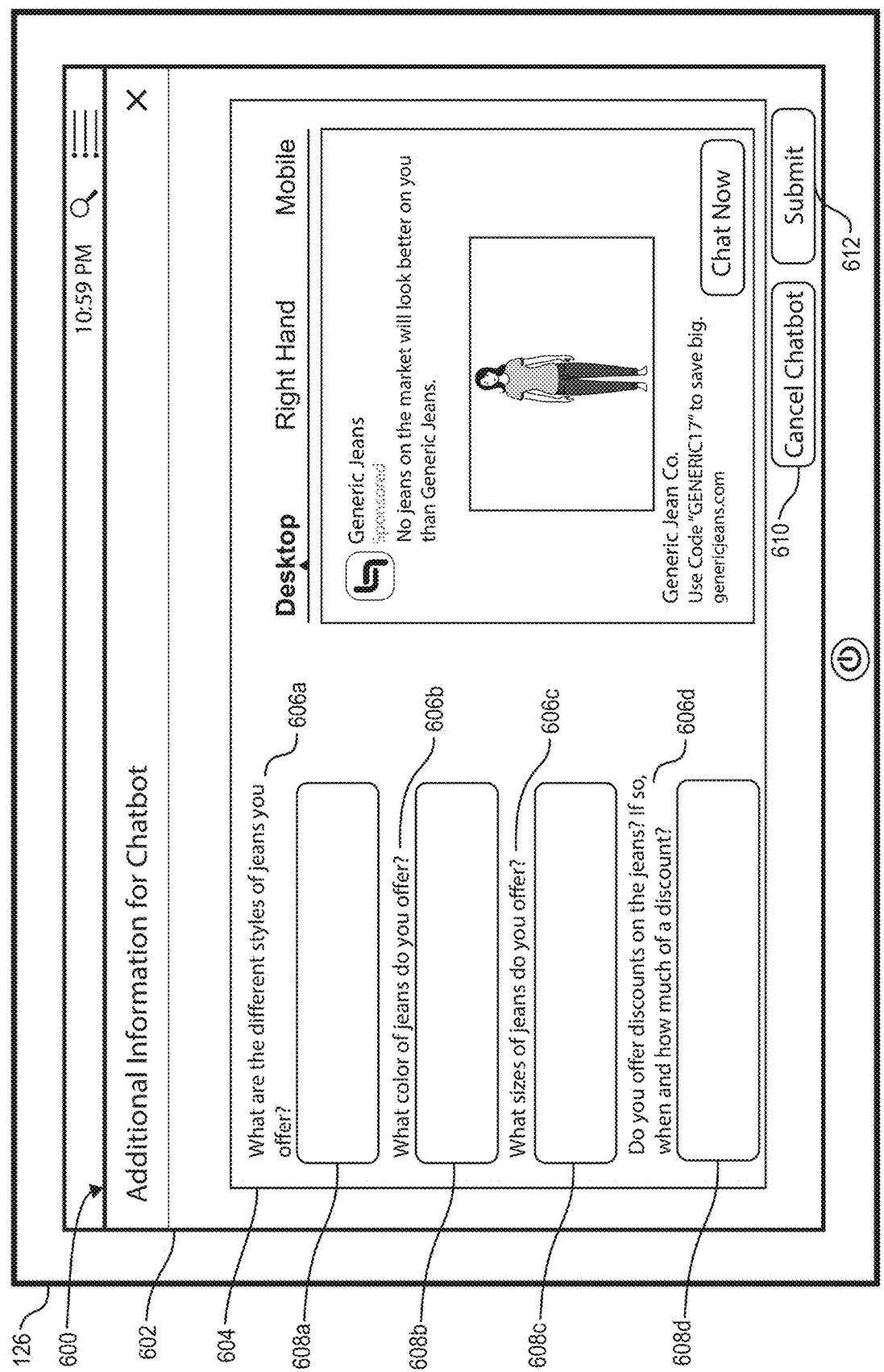
FIG. 6 illustrates a graphical user interface for prompting an administrator associated with a digital advertisement to provide missing information related to a received digital advertisement in accordance with one or more embodiments.

As further shown in FIG. 2B, after determining that the aggregated data does not include missing information, the networking system 104 optionally performs the act 210c of prompting the advertiser to provide the missing information. For example, in some embodiments, the networking system 104 sends questions to the advertiser in a digital form with entry fields for the advertiser to send a response including the missing information. When doing so, the networking system 104 may provide such a digital form for display within the networking application 128. FIG. 6 provides an illustration of one such digital prompt form. Additionally, or alternatively, the networking system 104 may prompt the advertiser or merchant for the missing information through questions presented in the messaging application 130. In such embodiments, the advertiser or merchant provides responses through the messaging application 130.

While the paragraphs above describe a digital form or messaging application as a medium for prompting the advertiser to provide missing information, the networking system 104 may use any other suitable communication medium to provide such prompts. For example, the networking system 104 may use email, telephone calls, or short message service ("SMS") to prompt an advertiser for missing information.

After the networking system 104 prompts the advertiser to provide the missing information, the administrator device 126 optionally performs the act 212 of sending the missing information to the networking system 104. The networking system 104 in turn receives the missing information from the administrator device 126. In such embodiments, the administrator device 126 generally sends (and the networking system 104 generally receives) the missing information in a format consistent with the prompt to provide the missing information. Accordingly, in some embodiments, the administrator device 126 sends the missing information through a digital form, the networking application 128, the messaging application 130, email, telephone, or other suitable communication medium.

As noted above, in addition to collecting data related to the received digital advertisement, the networking system 104 trains a chatbot. Accordingly, as further shown in FIG. 2B, the networking system 104 performs the act 214 of training a chatbot to automatically communicate with users. In particular, in some embodiments, the networking system 104 trains the chatbot to automatically communicate with users in automated conversation exchanges related to a received digital advertisement based on the common conversation exchanges and the collected data related to the received digital advertisement.

When performing the act 214, the networking system 104 uses an NLP platform, machine-learning engine for conversational dialogue, or artificial-intelligence platform to iteratively train a chatbot to automatically converse with users concerning subjects related to the received digital advertisement. For example, the networking system 104 may use the open source Artificial Linguistic Internet Computer Entity ("ALICE") engine and the open source Artificial Intelligence Mark Language ("AIML") to train the chatbot. Alternatively, the networking system 104 may use Facebook's Wit.ai platform to train the chatbot. For ease of reference, this disclosure refers to such NLP platforms, machine-learning engines for conversational dialogue, and artificial-intelligence platforms as chatbot platforms.

In some embodiments, for instance, the networking system 104 provides both the collected data related to the received digital advertisement and the common conversation exchanges to a chatbot platform, such as Facebook's Wit.ai. The chatbot platform then iteratively analyzes common inputs, corresponding responses, and/or common responses to identify and learn word entities and syntax patterns from the common inputs, corresponding responses, and/or common responses. In some embodiments, the chatbot platform also iteratively analyzes common sequences to learn common orders of inputs and responses from among the common conversation exchanges. Based on this analysis, the chatbot platform uses data from the collected data related to the received digital advertisement—such as words, phrases, quantities, or other information—to construct inputs and responses that simulate the common inputs, corresponding responses, and/or common responses. In some such embodiments, the chatbot platform uses words, phrases, quantities, or other information from the collected data to form inputs and responses having a same intent as the common inputs, corresponding responses, and/or common responses.

As shown in FIG. 2B, as part of the act 214, the networking system 104 optionally performs the act 214a of generating predetermined inputs and predetermined responses. The term "predetermined input" refers to an input that a chatbot generates in anticipation of an automated conversation. For example, a predetermined input may include routine inputs, such as, "How can I help you today?," "Are you still there?," or "Thank you for chatting with me." Conversely, the term "predetermined response" refers to a response that a chatbot generates in anticipation of responding to an input of an automated conversation. For example, a predetermined response may include anticipated responses to common questions, such as responses saying, "It comes in sizes zero through twelve" and "I'm sorry, we are currently out of stock."

As suggested above, in some embodiments, the networking system 104 generates one or more predetermined inputs for an automated conversation exchange based on common inputs and collected data related to the received digital advertisement. In some such embodiments, the networking system 104 generates predetermined inputs having a same intent with some or all the common inputs using words, phrases, or quantities from the collected data. Moreover, the networking system 104 optionally generates such predetermined inputs using a syntax pattern detected within the common inputs.

Similarly, in some embodiments, the networking system 104 generates one or more predetermined responses for an automated conversation exchange based on common responses and collected data related to the received digital advertisement. In some such embodiments, for instance, the networking system 104 generates predetermined responses having a same intent as some or all the common responses using words, phrases, or quantities from the collected data related to the received digital advertisement. As with some of the predetermined inputs, the networking system 104 optionally generates such predetermined responses using a syntax pattern detected within the common responses.

As further shown in FIG. 2B, in addition or in the alternative to generating predetermined inputs and responses, the networking system 104 optionally performs the act 214b of training the chatbot to customize inputs and customize responses. When training the chatbot to customize inputs and responses, the networking system 104 trains the chatbot to create inputs and responses customized for any given automated conversation with a user of the networking system 104. Specifically, the networking system 104 trains the chatbot to customize inputs and responses in exchanges concerning subjects related to a received digital advertisement. In other words, the networking system 104 trains the chatbot to customize inputs or responses so that the chatbot can automatically converse with a user using customized inputs or responses.

In some embodiments, the networking system 104 trains the chatbot to customize inputs or responses for an automated conversation exchange based on common inputs or common responses and collected data related to a received digital advertisement. For example, the networking system 104 may train the chatbot to customize inputs that mimic the intent and syntax pattern of one of the common inputs using words, phrases, quantities, or other information from the collected data—but customized to a user's interaction with the received digital advertisement. As another example, the networking system 104 may train the chatbot to customize responses that mimic the intent and syntax pattern of one of the common responses using words, phrases, quantities, or other information from the collected data—but customized to a user's inputs prior to the customized response.

For instance, the networking system 104 may train the chatbot to customize an input based on information indicating that a user selected a portion of the received digital advertisement, such as an indication that a user selected (a) an object within an image or video of the received digital advertisement or (b) selected a selectable-option to chat. Alternatively, the networking system 104 may train the chatbot to customize an input based on a networking profile of a user of the networking system 104 who initiates a messaging thread with the chatbot. In some such embodiments, for example, the networking system 104 trains the chatbot to use particular words or phrases based on common inputs associated with users of the networking system 104 who (a) have an affinity coefficient—above a threshold—with the user who initiated the messaging thread and (b) are associated with relevant common inputs from messaging threads associated with similar digital advertisements.

Similarly, the networking system 104 may train the chatbot to use a user's input (or prior inputs) within a messaging thread as a trigger for customizing a response. For instance, the networking system 104 trains the chatbot to determine (a) an intent of a user's input using NLP and (b) a corresponding common response to the user's input from among the common conversation exchanges. The networking system 104 likewise trains the chatbot to mimic the intent and the syntax pattern of the identified common response using words, phrases, quantities, or other information from the collected data. For example, the networking system 104 may train a chatbot to determine that the intent of a user's input—that says, "How much does the phone cost?"—comprises a price inquiry. The networking system 104 may also train the chatbot to determine that common responses to such user inputs have an intent of identifying a price for a model—such as responses that say "You can buy a basic model for $400" and form the bases for the common responses. Upon determining an appropriate intent for a common response, the networking system 104 trains the chatbot to identify words, phrases, quantities, or other information from the collected data that mimic the syntax pattern of the common response. Based on the training described above, for example, the chatbot may send a customized response saying, "You can buy a Model 4S for $350."

As further shown in FIG. 2B, in addition to training the chatbot to customize inputs and responses, the networking system 104 optionally performs the act 214c of training the chatbot to order inputs and responses. In some embodiments, for instance, the networking system 104 trains the chatbot to use common sequences determined from among common conversation exchanges to order an input and response during automated conversation exchanges. In some such embodiments, for example, the networking system 104 trains the chatbot to detect an intent of a user's input and to determine a corresponding common response (along with its intent) from among common conversation exchanges. By determining a corresponding common response and its intent, the networking system 104 trains the chatbot to provide common responses in an order that tracks the common sequences.

Similarly, in some embodiments, the networking system 104 trains the chatbot to use common sequences determined from among common conversation exchanges to order multiple inputs and responses during automated conversation exchanges. For example, in addition to training the chatbot to detect an intent of a user's input and to determine a corresponding common response, as above, the networking system 104 trains the chatbot to identify multiple pairs of common inputs and common responses in a common sequence from among the conversation exchanges. By identifying these multiple pairs, the networking system 104 trains the chatbot to predict a likelihood that an automated conversation will follow a same or similar sequence from a common sequence. The networking system 104 then trains the chatbot to use the common sequence to identify and predict—with greater probability of accuracy—a common response based on the identified common sequence as well as a forthcoming user input and corresponding common response.

In addition to training the chatbot to provide both inputs and responses, in some embodiments, the networking system 104 trains the chatbot to perform tasks specified by an advertiser or merchant associated with a received digital advertisement. Accordingly, as shown in FIG. 2B, the networking system 104 optionally performs the act 214d of training the chatbot to perform specified tasks. In some embodiments, an advertiser or a merchant specifies the tasks. For example, in some such circumstances, the advertiser or merchant may indicate a specified task for a chatbot to perform within a digital form for a digital advertisement.

Alternatively, a default or user setting may specify that the networking system 104 direct the chatbot to perform common tasks performed during messaging threads associated with similar digital advertisements. The term "common task" refers to a task repeatedly performed by a representative of an advertiser or merchant or by a chatbot in a messaging thread. In some embodiments, the networking system 104 identifies a repeated task as a common task when the task is performed above a threshold number of occurrences or a threshold percentage of times within messaging threads associated with similar digital advertisements. When a setting specifies that a chatbot perform certain tasks, in some embodiments, the networking system 104 sends a notice to the administrator device 126 for display that identifies common tasks performed in messaging threads associated with similar digital advertisements. Such notices indicate to the administrator 132 tasks that the networking system 104 will train the chatbot to perform under appropriate circumstances. In some such embodiments, the networking system 104 also provides options for the administrator 132 to accept or reject training a chatbot to perform the shown common tasks.

As suggested above, the tasks that the networking system 104 trains the chatbot to perform vary. For example, in some embodiments, the networking system 104 trains the chatbot to initiate a payment associated with a received digital advertisement. In some such embodiments, the networking system 104 trains the chatbot to initiate a payment transaction on behalf of a user for a product or service advertised by the received digital advertisement, such as by providing a payment prompt in a messaging thread. To implement initiating payments, the networking system 104 optionally trains chatbot to perform the method disclosed in application Ser. No. 15/389,108, filed Dec. 22, 2016, entitled Processing Payment Transactions Using Artificial Intelligence Messaging Services, which is incorporated in its entirety by reference.

Alternatively, in some embodiments, the networking system 104 trains the chatbot to provide a link to a webpage associated with the received digital advertisement. For example, in some cases, the networking system 104 trains the chatbot to provide, within a messaging thread, a link to a webpage that facilitates purchase of a product or service advertised by the received digital advertisement. The networking system 104 may train the chatbot to provide such a link based on a common input or common response that triggers the chatbot to provide the link.

As another example, in some embodiments, the networking system 104 trains the chatbot to qualify a user for purchase of a product or service advertised by the received digital advertisement. For instance, in certain embodiments, the networking system 104 trains the chatbot to provide a digital application form to qualify for purchase of a product or for use of a service advertised by the received digital advertisement, where the digital application form has Tillable fields. In some such embodiments, the networking system 104 trains the chatbot to perform the method disclosed in application Ser. No. 15/395,543, filed Dec. 30, 2016, entitled User Communications with a Third Party Through a Social Networking System, which is incorporated in its entirety by reference.

Moreover, in some embodiments, the networking system 104 trains the chatbot to connect a user to a representative of an advertiser associated with a received digital advertisement. For instance, in some embodiments, the networking system 104 trains the chatbot to connect the representative to a messaging thread when the chatbot cannot respond to a user input. In some such embodiments, the networking system 104 trains the chatbot to connect the representative to the messaging thread when the chatbot cannot generate a predetermined response or a customized response determined to be responsive. A chatbot may use a threshold percentage of responsiveness in such circumstance to determine whether a predetermined or customized response is responsive.

Turning now to FIG. 2C, as noted above, in addition to training a chatbot, in some embodiments, the networking system 104 provides a preview of the trained chatbot. FIG. 2C illustrates a sequence of acts 216-232 that comprise different embodiments of providing a preview of the chatbot. Specifically, the acts 216-222 represent an embodiment of the networking system 104 that uses sample inputs and sample responses as a preview. By contrast, the acts 224-232 represent an embodiment of the networking system 104 that uses a chatbot user interface as a preview.

As shown in FIG. 2C, the networking system 104 optionally performs the act 216 of generating sample inputs and sample responses. When performing the act 216, the networking system 104 sends the sample inputs and responses to the administrator device 126. For example, the networking system 104 may provide the sample inputs and sample responses to the administrator device 126 for display within the networking application 128. In some such embodiments, the sample inputs and sample responses represent samples of potential automated conversation exchanges between the chatbot and a user of the networking system 104. For instance, the sample inputs and sample responses may comprise a script or dialogue of predetermined inputs and predetermined responses in a common sequence. Additionally, in some embodiments, the sample inputs and sample responses may comprise a script or dialogue of predetermined inputs and predetermined responses relating to a specific topic or patterned after a common sequence.

As further shown in FIG. 2C, in addition to sending the sample inputs and sample responses, the networking system 104 performs the act 218 of providing an option to edit to the administrator device 126. In some embodiments, for example, the networking system 104 provides a selectable option to edit the sample inputs or sample responses within a user interface of the networking application 128. In some such embodiments, the networking system 104 provides a selectable option that—once selected—allows the administrator 132 to input text into the networking application 128 that revises either or both of a sample input and a sample response.

After receiving an indication of an edit, the administrator device 126 optionally performs the act 220 of sending an edit for a sample input or a sample response, and the networking system 104 performs the act 222 of changing a sample input or a sample response. For example, in some embodiments, the administrator device 126 detects a user input revising a sample input or a sample response within the networking application 128. The administrator device 126 then sends data representing that edit to the networking system 104. Upon receiving an indication of the edit to a sample input or a sample response from the administrator device 126, the networking system 104 changes the sample input or sample response in accordance with the received indication of the edit. Accordingly, the networking system 104 changes the sample inputs or sample responses to reflect edits of the administrator 132. In such embodiments, the networking system 104 changes any predetermined inputs or predetermined responses shown as sample inputs and sample responses based on revisions from the administrator 132.

In addition or in the alternative to a sample input and sample response preview, the networking system 104 provides a chatbot user interface as a preview. As shown in FIG. 2C, the networking system 104 performs the act 224 of providing a chatbot user interface to the administrator device 126. In some embodiments, the messaging application 130 comprises the chatbot user interface. Alternatively, in certain embodiments, the networking application 128 comprises the chatbot user interface. Regardless of how the networking system 104 provides the interface, the networking system 104 uses the chatbot user interface as a preview showing how the chatbot automatically communicate with users in automated conversation exchanges. Accordingly, the administrator device 126 displays both inputs and responses within the chatbot user interface as exchanges between the chatbot and the administrator 132.

As further shown in FIG. 2C, both the administrator device 126 and the networking system 104 perform the act 226 of sending and receiving an input, as well as the act 228 of sending and receiving a response. As indicated by the double arrows going in opposite directions for the acts 226 and 228, the administrator device 126 and the networking system 104 may exchange inputs and responses during a preview of the chatbot. Consistent with the training described above, the networking system 104 may provide predetermined inputs or responses during a preview or, alternatively, customized inputs or responses during a preview. In other words, the preview allows the administrator 132 to interact with the chatbot as a user of the networking system 104 would interact with the chatbot. Regardless of the form of input and response, the chatbot user interface provides a test run for the administrator 132 to engage with the chatbot in a back-and-forth of automated conversation exchanges.

As suggested above, in some embodiments, the chatbot user interface includes an option to edit inputs or responses during an automated conversation exchange. This edit option enables the administrator to select and edit any predetermined input, predetermined response, customized input, or customized response presented during a preview using the chatbot user interface. Accordingly, in some embodiments, the administrator device 126 performs the act 230 of sending an edit for an input or a response to the networking system 104. For example, the administrator device 126 may detect a user input revising an input or response within the messaging application 130. The administrator device 126 then sends data representing that edit to the networking system 104. Upon receiving an indication of the edit, the networking system 104 changes the input or response in accordance with the received indication of the edit.

In either preview option, the networking system 104 optionally uses the received edits to retrain the chatbot. As shown in FIG. 2C, the networking system 104 optionally performs the act 232 of retraining the chatbot to automatically communicate with users. In such embodiments, the networking system 104 uses a chatbot platform to retrain the chatbot, as above, but by iteratively using data relevant to the edit. For example, the networking system 104 may train the chatbot to use a different word, phrase, quantity, or other information that reflects the edit when the chatbot receives an input or response having the same intent as the input or response that preceded the edited input or response. Alternatively, the networking system 104 may train the chatbot to use a different word, phrase, quantity, or other information that reflects the edit in predetermined inputs or predetermined responses that also use the edited word, phrase, quantity, or other information.

As noted above, the networking system 104 collects data and trains a chatbot based on information related to a received digital advertisement. In some cases, that information comes from a digital form for a digital advertisement. FIG. 3 illustrates a graphical user interface for creating a digital advertisement for the networking system 104 using a digital submission form. Consistent with the disclosure above, the digital advertisement shown in the preview of the digital submission form becomes a received digital advertisement after the administrator device 126 sends (and the networking system 104 receives) the digital submission form. As described below, the digital submission form includes information provided directly by the advertiser or merchant that the networking system 104 associates with the digital advertisement.

As shown in FIG. 3, the networking system 104 provides a digital submission form 304 for display within a graphical user interface 300. A screen 302 of the administrator device 126 in turn presents the digital submission form 304 for the administrator 132. The digital submission form 304 includes entry fields 306-320 in which the administrator 132 may input information related to a digital advertisement. To facilitate submission of that information, the digital submission form 304 includes an advertisement-name field 306, an advertisement-text field 308, an advertisement-category field 310, a task field 312, a destination-URL field 314, an advertisement-image-caption field 316, a coupon field 318, and a call-to-action field 320.

As its name suggests, the advertisement-name field 306 comprises an entry field in which the administrator 132 may input a name for the digital advertisement. Similarly, the advertisement-text field 308 comprises an entry field in which the administrator 132 may input a text to be included with the digital advertisement. As suggested above, upon receipt, the networking system 104 analyzes the advertisement name and the advertisement text to detect keywords or phrases as characteristics associated with the received digital advertisement.

As depicted by FIG. 3, the next entry field is the advertisement-category field 310. The advertisement-category field 310 includes a drop-down menu of different advertisement categories from which the administrator 132 may choose to categorize the digital advertisement. Although not shown, the advertisement-category field 310 includes different advertisement categories for selection within the drop-down menu, including advertisement categories for accessories, automobiles, beverages, clothing, computers, food, lawn services, loans, mortgages, mobile applications, movies, shoes, smart phones, television, toiletries, and video games. Any suitable advertisement category may be used.

In some embodiments, the digital submission form 304 further includes advertisement subcategories that the networking system 104 provides based on an initial selection from the advertisement-category field 310. For example, if the administrator device 126 receives an indication that the administrator 132 selects automobiles as an advertisement category, the networking application 128 includes instructions that cause the administrator device 126 to update the digital submission form 304 to include an advertisement-subcategory field comprising various advertisement subcategories, such as advertisement subcategories for sedans, sports cars, sports utility vehicles, station wagons, trucks, and vans.

As noted above, in some embodiments, the networking system 104 uses an advertisement category designated by an advertiser as one of the characteristics associated with a received digital advertisement. Indeed, in some embodiments, the networking system 104 may use the designated advertisement category as the only characteristic upon which the networking system 104 determines similar digital advertisements. Conversely, in other embodiments, the networking system 104 uses an advertisement category as merely one characteristic upon which it determines similar digital advertisements.

In addition to facilitating a designation of advertisement categories, the digital submission form 304 also facilitates specifying a task for a chatbot to perform. As shown in FIG. 3, when the administrator device 126 receives an indication that the administrator 132 selects a specific advertisement category, the networking application 128 includes instructions that cause the administrator device 126 to update the digital submission form 304 to include the task field 312 with selectable options for the administrator 132 to specify whether to train a chatbot to perform a task related to the advertisement category. Specifically, the task field 312 comprises an entry field in which the administrator 132 may select whether a chatbot performs a specified task. In this case, the task field 312 comprises a drop-down menu of yes-or-no choices from which the administrator 132 may choose. As suggested above, upon receipt of a choice to specify a task, the networking system 104 identifies the selected task as a characteristic associated with the received digital advertisement.

If the administrator device 126 detects user input selecting "Yes," the administrator device 126 sends data to the networking system 104 that triggers the networking system 104 to train the chatbot to perform the specified task. If the administrator device 126 detects user input selecting "No," the administrator device 126 sends data to the networking system 104 that indicates to the networking system 104 to not train the chatbot to perform the specified task. As shown in FIG. 3, the task field 312 includes selectable options for the administrator 132 to specify whether to train the chatbot to initiate purchase of a product. In alternative or additional embodiments, however, the networking system 104 provides task fields that enable the administrator 132 to specify various other tasks for the chatbot to perform, such as providing a link to a webpage, qualifying a user for a purchase, or connecting a user to a representative.

As further shown in FIG. 3, the destination-URL field 314, advertisement-image-caption field 316, and coupon field 318 comprise entry fields in which the administrator 132 may respectively input a destination URL hyperlinked to the digital advertisement, a caption for an image displayed as part of the digital advertisement, and a coupon associated with the digital advertisement, such as a coupon code or information concerning a discount associated with a product or service featured by the digital advertisement. In some embodiments, the networking system 104 determines each of the destination URL, keywords or keyphrases within the image caption, and keywords or keyphrases within the coupon information as characteristics associated with the digital advertisement.

In addition to entry fields 314, 316, and 318. the digital submission form 304 further includes the call-to-action field 320. The call-to-action field 320 includes a drop-down menu of different call-to-action buttons from which the administrator 132 may choose to include with the digital advertisement. A call-to-action button is a button that bears an instruction, such as "shop now," to provoke a response from a user and that—once the button is selected—triggers an action, such as directing a web browser to navigate to a URL in a new tab. Although not shown, the call-to-action field 320 includes different call-to-action choices for selection within the drop-down menu, including call-to-action choices of "Buy Now," "Chat Now," "Download Now," "Join Today," "Request A Free Quote," "Shop Now," "Sign Up," "Subscribe Now," "Try It For Free," and "Watch Now."

As depicted in FIG. 3, the administrator 132 selects the "Chat Now" call-to-action button to include with the digital advertisement. When selected, the "Chat Now" call-to-action button triggers a chatbot associated with a received digital advertisement to initiate a messaging thread with a user. While FIG. 3 illustrates a single call-to-action field 320, in some embodiments, the digital submission form 304 includes multiple call-to-action fields to enable the administrator 132 to insert multiple call-to-action buttons into a digital advertisement. Similar to the information related to the digital advertisement described above, the networking system 104 optionally determines any selected call-to-action button as a characteristic associated with a received digital advertisement.

While FIG. 3 illustrates entry fields 306-320, in some embodiments, a digital submission form includes entry fields for a range of other topics. For example, a digital submission form may include entry fields for details and conditions of an offer featured in a digital advertisement; other information of interest to a user concerning the received digital advertisement, such as the name of a product or service, pricing for the product or service, or information about upcoming promotions; and qualifications required to qualify for a product or service, such as a credit rating or income level required to qualify for a product or service.

In addition to the entry fields 306-320, the digital submission form 304 further includes an advertisement preview 322. The advertisement preview 322 comprises a preview of the digital advertisement for submission to the networking system 104. As shown in FIG. 3, the advertisement preview 322 includes an advertisement name, an advertisement text, a destination URL, an image caption, a coupon code, and a call-to-action button that reflects the inputs of the administrator 132 within the entry fields 306-308 and 312-320. The advertisement preview 322 further includes an image 324 that the administrator 132 uploads to include within the digital advertisement. Consistent with the disclosure above, the image 324 represents an example of an image that the networking system 104 analyzes to determine characteristics associated with a received digital advertisement.

As further shown in FIG. 3, the graphical user interface 300 includes an upload option 326. When the administrator device 126 detects that the administrator 132 selects the upload option 326, the administrator device 126 sends data representing the digital submission form 304 to the networking system 104. By sending the digital submission form 304, the administrator device 126 sends a digital advertisement and information related to the digital advertisement to the networking system 104. The networking system 104 then analyzes the digital advertisement as a received digital advertisement consistent with the disclosure above.

Figure 4:
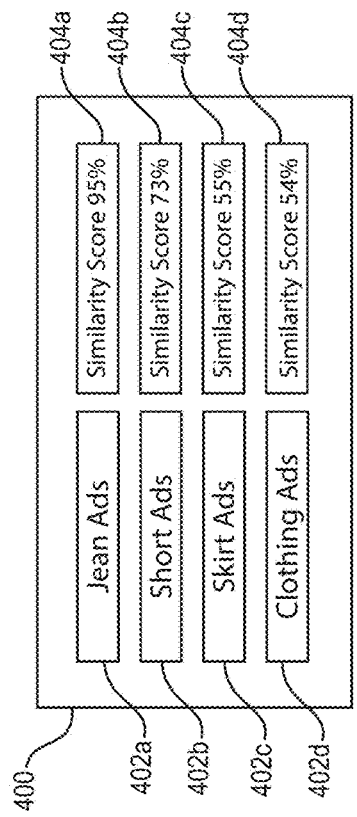
FIG. 4 illustrates similarity scores for categorized previous digital advertisements in accordance with one or more embodiments.

Turning now to FIG. 4, as noted above, the networking system 104 analyzes the characteristics associated with a received digital advertisement and the characteristics associated with previous digital advertisements to identify shared characteristics and similar digital advertisements. In some embodiments, the networking system 104 identifies similar digital advertisements based on similarity scores. In addition to using similarity scores, the networking system 104 optionally compares the characteristics of a received digital advertisement to characteristics of previous digital advertisements categorized within various advertisement categories. By doing so, the networking system 104 uses advertisement categories as a heuristic or shortcut for identifying a group of similar digital advertisements for the received digital advertisement. FIG. 4 illustrates one possible embodiment of using advertisement categories as a heuristic or shortcut.

Specifically, FIG. 4 illustrates a similarity-score database 400 that comprises similarity scores for previous digital advertisements categorized within various advertisement categories. Although the networking system 104 optionally makes accessible the similarity-score database 400 to the administrator 132 through the networking application 128, in some embodiments, the networking system 104 generates similarity scores without actively disclosing them through the networking application 128. For purposes of explanation, however, FIG. 4 illustrates various similarity scores within a visual representation of the similarity-score database 400.

As shown in FIG. 4, the similarity-score database 400 includes advertisement categories 402a-402d. The similar-score database 400 further includes a similarity score 404a that corresponds to the advertisement category 402a, a similarity score 404b that corresponds to the advertisement category 402b, a similarity score 404c that corresponds to the advertisement category 402c, and a similarity score 404d that corresponds to the advertisement category 402d.

In the embodiment shown in FIG. 4, the networking system 104 uses an advertisement category designated for the received digital advertisement to identify other advertisement categories that commonly include previous digital advertisements having favorable similarity scores for digital advertisements with the same advertisement category as that designated for the received digital advertisement. In other words, the networking system 104 uses advertisement categories as a shortcut for identifying previous digital advertisements that may be similar to the received digital advertisement. In some such embodiments, the networking system 104 uses a threshold similarity score for digital advertisements within advertisement categories to identify candidate advertisement categories comprising previous digital advertisements that may be similar to the received digital advertisement. As shown in FIG. 4, the networking system 104 uses a threshold similar score of 50% to identify candidate advertisement categories comprising previous digital advertisements that may be similar to the received digital advertisement—that is, the advertisement categories 402a-402d.

Having identified candidate advertisement categories 402a-402d, the networking system 104 generates a similarity score for each of the previous digital advertisements categorized within the advertisement categories 402a-402d. For the embodiment shown in FIG. 4, the networking system 104 generates a similarity score for each of the previous digital advertisements within the advertisement categories 402a-402d, where the similarity scores quantify a similarity between the received digital advertisement and a previous digital advertisement based on various characteristics of the received digital advertisement and a previous digital advertisement. The networking system 104 then averages the similarity scores for each of the advertisement categories 402a-402d.

As shown in FIG. 4, the similarity scores 404a-404d each represent an average score between (a) the received digital advertisement submitted with the digital submission form 304 and (b) previous digital advertisements categorized within one of the advertisement categories 402a-402d. In other words, the similar scores 404a-404d represent a collective similarity between the received digital advertisement and the previous digital advertisements within one of the advertisement categories 402a-402d.

Based on the similarity scores associated with each of the advertisement categories 402a-402d, the networking system 104 identifies the previous digital advertisements categorized within the advertisement category 402a as similar digital advertisements to the received digital advertisement. In other words, in this embodiment, the networking system 104 identifies previous digital advertisements within a top-scoring advertisement category as the similar digital advertisements.

Figure 5:
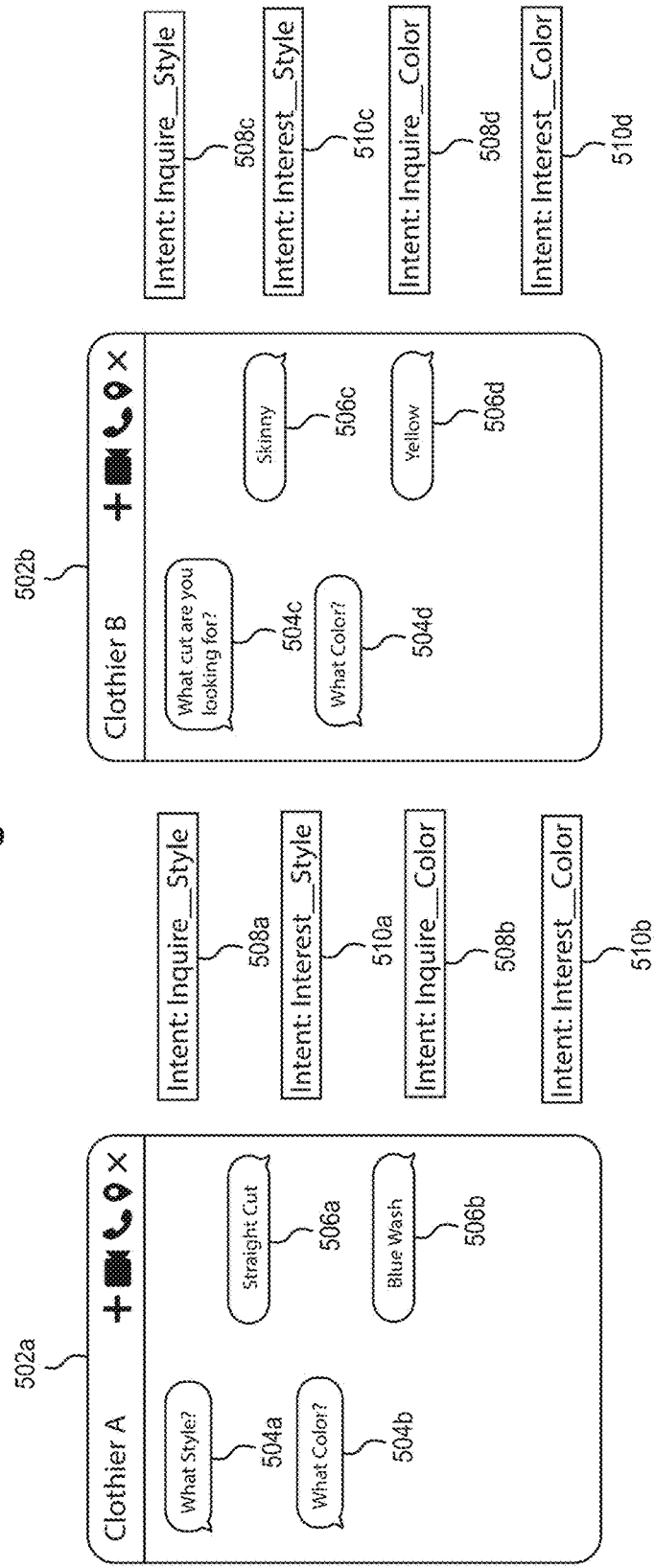
FIG. 5 illustrates messaging threads of previous digital advertisements similar to a received digital advertisement in accordance with one or more embodiments.

As noted above, after identifying similar digital advertisements, the networking system 104 accesses and analyzes messaging threads associated with the similar digital advertisements. The networking system 104 performs this analysis to identify common conversation exchanges. FIG. 5 provides a schematic diagram representing the networking system 104 analyzing such messaging threads to identify common conversation exchanges.

Specifically, FIG. 5 illustrates a first messaging thread 502a and a second messaging thread 502b. Both the messaging threads 502a and 502b represent messaging threads associated with similar digital advertisements. In particular, both the messaging threads 502a and 502b are associated with similar digital advertisements categorized within the advertisement category 402a. In other words, the messaging threads 502a and 502b are associated with the advertisement category that the networking system 104 determined to include digital advertisements similar to the received digital advertisement.

As shown in FIG. 5, the messaging threads 502a and 502b each include inputs and responses. In particular, the first messaging thread 502a includes a first input 504a and a second input 504b from an advertiser associated with a similar digital advertisement. Relatedly, the first messaging thread 502a also includes a first response 506a that responds to the first input 504a and a second response 506b that responds to the second input 504b. Both the first response 506a and the second response 506b come from a user of the networking system 104.

Similarly, the second messaging thread 502b includes a third input 504c and a fourth input 504d from another advertiser associated with another similar digital advertisement. Relatedly, the second messaging thread 502b also includes a third response 506c that responds to the third input 504c, as well as a fourth response 506d that responds to the fourth input 504d. Both the third response 506c and the fourth response 506d come from a user of the networking system 104. While FIG. 5 illustrates inputs from an advertiser associated with a similar digital advertisement and responses from a user of the networking system 104, some messaging threads contain the opposite: inputs from a user of the networking system 104 and responses from an advertiser associated with a similar digital advertisement.

Consistent with the disclosure above, the networking system 104 analyzes the messaging threads 502a and 502b. In particular, the networking system 104 applies NLP to determine an intent of each of the inputs 504a-504d and an intent of each of the responses 506a-506d. As part of that analysis, the networking system 104 assigns intent-recognition tags to each of the inputs 504a-504d and to each of the responses 506a-506d. In particular, the networking system 104 assigns a first input-intent-recognition tag 508a to the first input 504a, a second input-intent-recognition tag 508b to the second input 504b, a third input-intent-recognition tag 508c to the third input 504c, and a fourth input-intent-recognition tag 508d to the fourth input 504d. Conversely, the networking system 104 assigns a first response-intent-recognition tag 510a to the first response 506a, a second response-intent-recognition tag 510b to the second response 506b, a third response-intent-recognition tag 510c to the third response 506c, and a fourth response-intent-recognition tag 510d to the fourth response 506d.

Each of the input-intent-recognition tags 508a-508d identify an intent for an input, and each of the response-intent-recognition tags 510a-510d identify an intent for a response. As shown in FIG. 5, the inputs 504a and 504b in the first messaging thread 502a respectively share the same intent as the inputs 504c and 504d in the second messaging thread 502b. Similarly, the responses 506a and 506b in the first messaging thread 502a respectively share the same intent as the responses 506c and 506d in the second messaging thread 502b. In other words, the first messaging thread 502a and the second messaging thread 502b include repeated exchanges of inputs and responses having a same intent.

Although not shown in FIG. 5, the networking system 104 analyzes additional messaging threads associated with the similar digital advertisements and identifies other inputs and responses having the same intent as each of the inputs 504a-504d and the responses 506a-506d. In some instances, the networking system 104 identifies other inputs that have the same intent as the first input 504a and the third input 504c (collectively referred to as the "first repeated input") and other inputs that have the same intent as the second input 504b and the fourth input 504d (collectively referred to as the "second repeated input"). Similarly, in some instances, the networking system 104 identifies other responses responding to the first repeated input that have the same intent as the first response 506a and the third response 506c (collectively referred to as the "second repeated response") and other responses that have the same intent as the second response 506b and the fourth response 506d (collectively referred to as the "second repeated response").

After identifying the repeated inputs, the networking system 104 determines that the first and second repeated inputs exceed a first commonality threshold. This first commonality threshold represents a threshold measurement of input occurrences within the messaging threads associated with similar digital advertisements. Similarly, after identifying the repeated responses, the networking system 104 determines that the first and second repeated responses exceed a second commonality threshold. This second commonality threshold represents a threshold measurement of input occurrences within the messaging threads associated with similar digital advertisements. Based on these commonality-threshold determinations, the networking system 104 identifies the first and second repeated inputs as common inputs and the first and second repeated responses as common responses. Altogether, the networking system 104 identifies the common inputs and common responses as some of the common conversation exchanges. As noted above, in some embodiments, the networking system 104 identifies the common inputs and corresponding responses as some of the common conversation exchanges, without necessarily including common responses—because the corresponding responses may differ from each other.

In addition to identifying common inputs and common responses, in some instances, the networking system 104 identifies other inputs and responses within the other messaging threads that have a same sequence and same intents as the first input 504a and the first response 506a and the third input 504c and the third response 506c (collectively referred to as the "first repeated pair of inputs and responses"). Similarly, in some instances, the networking system 104 identifies other inputs and responses within the other messaging threads that have a same sequence and same intents as the second input 504b and the second response 506b and the fourth input 504d and the fourth response 506d (collectively referred to as the "second repeated pair of inputs and responses"). In yet other instances, the networking system 104 identifies a broader sequence of the exchanges shown in the first messaging thread 502a and the second messaging thread 502b. Specifically, the networking system 104 identifies other inputs and responses within the other messaging threads that have a same sequence and same intents as the inputs 504a and 504b and the responses 506a and 506b in the first messaging thread 502a and the inputs 504c and 504d and the responses 506c and 506d in the second messaging thread 502b (collectively referred to as the "collective repeated pairs of inputs and responses").

After identifying these repeated pairs of inputs and responses, the networking system 104 determines that the first and second repeated pairs of inputs and responses—and the collective repeated pairs of inputs and responses—exceed a sequence commonality threshold. This sequence commonality threshold represents a threshold measurement of sequence occurrences within the messaging threads. Based on the sequence-commonality-threshold determination, the networking system 104 identifies the first and second repeated pairs of inputs and responses—and the collective repeated pairs of inputs and responses—as common sequences among the common conversation exchanges.

Turning now to FIG. 6, as noted above, after identifying common conversation exchanges, the networking system 104 collects data related to the received digital advertisement. The networking system 104 collects such data from various sources to simulate the common conversation exchanges using information related to the received digital advertisement. But the networking system 104 may also determine that it lacks certain information—or lacks confidence in a probability that it has collected accurate information—to simulate those common conversation exchanges. Accordingly, the networking system 104 sometimes prompts an advertiser to provide missing information required to simulate some or all the common conversations. FIG. 6 provides one of several embodiments that the networking system 104 may use to provide that prompt.

As shown in FIG. 6, the networking system 104 provides a digital prompt form 604 for display within a graphical user interface 600. A screen 602 of the administrator device 126 in turn presents the digital prompt form 604 for the administrator 132. The digital prompt form 604 itself includes entry fields 608a, 608b, 608c, and 608d in which the administrator 132 may input information respectively responding to prompting inquiries 606a, 606b, 606c, and 606d from the networking system 104.

In the embodiment depicted by FIG. 6, the prompting inquiries 606a, 606b, 606c, and 606d respectively request information from the advertiser concerning topics about clothing styles, colors, sizes, and discounts. But the digital prompt form 604 may include prompting inquiries from any range of topics, including, but not limited to, prompting inquiries concerning an advertiser's goals, pricing for a product or service, specific tasks for a chatbot to perform, stock availability, promotions, user qualifications to apply for a service, offerings of a product or service in a geographic location, or offerings of a product or service during a season or particular time of year.

Each of the prompting inquiries 606a-606d correspond to a portion of a common conversation exchange. For example, the prompting inquiry 606a corresponds to the first repeated input identified as a common input by the networking system 104. Additionally, the prompting inquiry 606b corresponds to the second repeated input identified as a common input by the networking system 104. The prompting inquiries 606c and 606d likewise correspond to a common input or common response identified by the networking system 104.

As further shown in FIG. 6, the graphical user interface 600 includes a cancel option 610 and a submit option 612. When the administrator device 126 detects that the administrator 132 selects the cancel option 610, the administrator device 126 sends a signal to the networking system 104 to cancel use of a chatbot in connection with the received digital advertisement. Conversely, when the administrator device 126 detects that the administrator 132 selects the submit option 612, the administrator device 126 sends data representing the digital prompt form 604 to the networking system 104. By sending the digital prompt form 604, the administrator device 126 sends certain missing information required to simulate some or all common conversation exchanges associated with similar digital advertisements to the networking system 104. The networking system 104 then trains the chatbot for the received digital advertisement consistent with the disclosure above.

Figure 7:
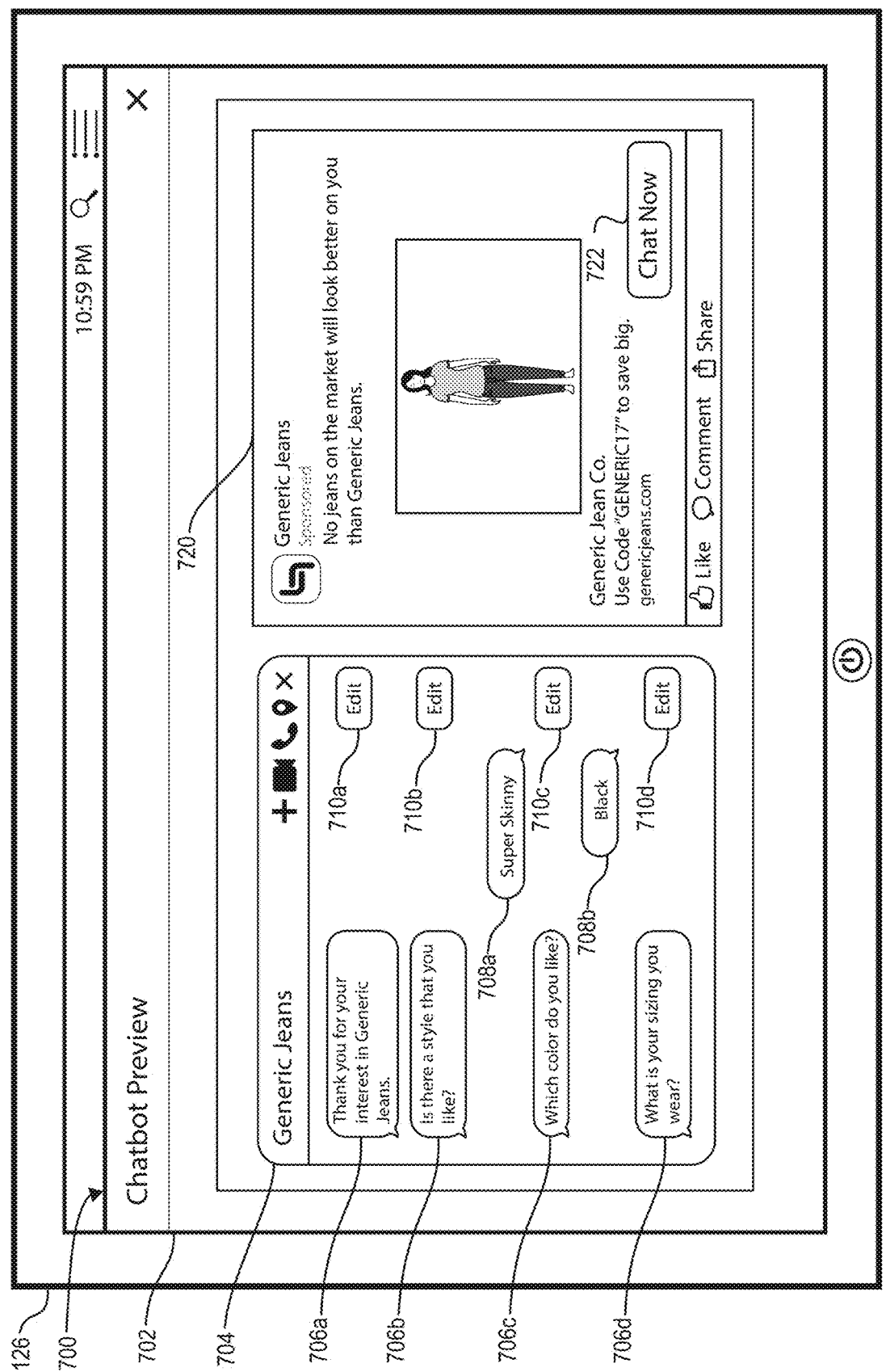
FIG. 7 illustrates a chatbot preview in accordance with one or more embodiments.

As noted above, after training a chatbot, the networking system 104 optionally provides a preview of the chatbot. FIG. 7 illustrates one embodiment of a chatbot preview. As shown in FIG. 7, the networking system 104 provides a chatbot user interface 704 for display within a larger graphical user interface 700. A screen 702 of the administrator device 126 in turn presents the chatbot user interface 704 for the administrator 132. When the administrator device 126 detects a selection of an initiate-chat option 722 within the digital advertisement preview 720, the networking system 104 initiates customizing inputs displayed within the chatbot user interface 704.

As shown in FIG. 7, the chatbot user interface 704 includes customized inputs 706a-706d from the trained chatbot. The chatbot sends the customized inputs 706a-706d to the administrator device 126 for presentation within the chatbot user interface 704 consistent with the chatbot's training to customize inputs based on common conversation exchanges and collected data related to the received digital advertisement.

As further shown in FIG. 7, the chatbot user interface 704 also includes responses 708a and 708b that the administrator device 126 sent to the networking system 104. The response 708a represents the response of the administrator 132 to the customized input 706b. Similarly, the response 708b represents the response of the administrator 132 to the customized input 706c. Accordingly, the customized inputs 706a-706d and the responses 708a and 708b depict a back-and-forth between the chatbot generating customized inputs and the administrator 132 responding in a preview of the trained chatbot's capabilities.

As noted above, in some embodiments, a chatbot preview includes an option to edit. As shown in FIG. 7, for example, the chatbot user interface 704 includes edit options 710a-710d. The edit options 710a, 710b, 710c, and 710d respectively correspond to (and enable editing of) the customized inputs 706a, 706b, 706c, and 706d. For example, when the administrator device 126 detects that the administrator 132 selects the edit option 710d, the administrator device 126 updates the graphical user interface 700 to include a cursor to edit the customized input 706d within the chatbot user interface 704.

When the administrator 132 inputs an edit, the administrator device 126 detects a user input revising the customized input 706d within the chatbot user interface 704. The administrator device 126 then sends data representing that edit to the networking system 104. Upon receiving an indication of the edit, the networking system 104 changes the customized input 706d in accordance with the received indication of the edit. As noted above, in some embodiments, the networking system 104 retrains the chatbot based on the received edit.

While the chatbot user interface 704 includes the customized inputs 706a-706d as shown in FIG. 7, in some embodiments, the trained chatbot generates customized responses that respond to inputs from the administrator 132. Similarly, in some embodiments, the chatbot user interface 704 includes edit options to edit such customized responses. Accordingly, the networking system 104 optionally provides chatbot previews that demonstrate customized inputs and customized responses from the chatbot and edit options for any such customized input and customized response.

Figure 8:
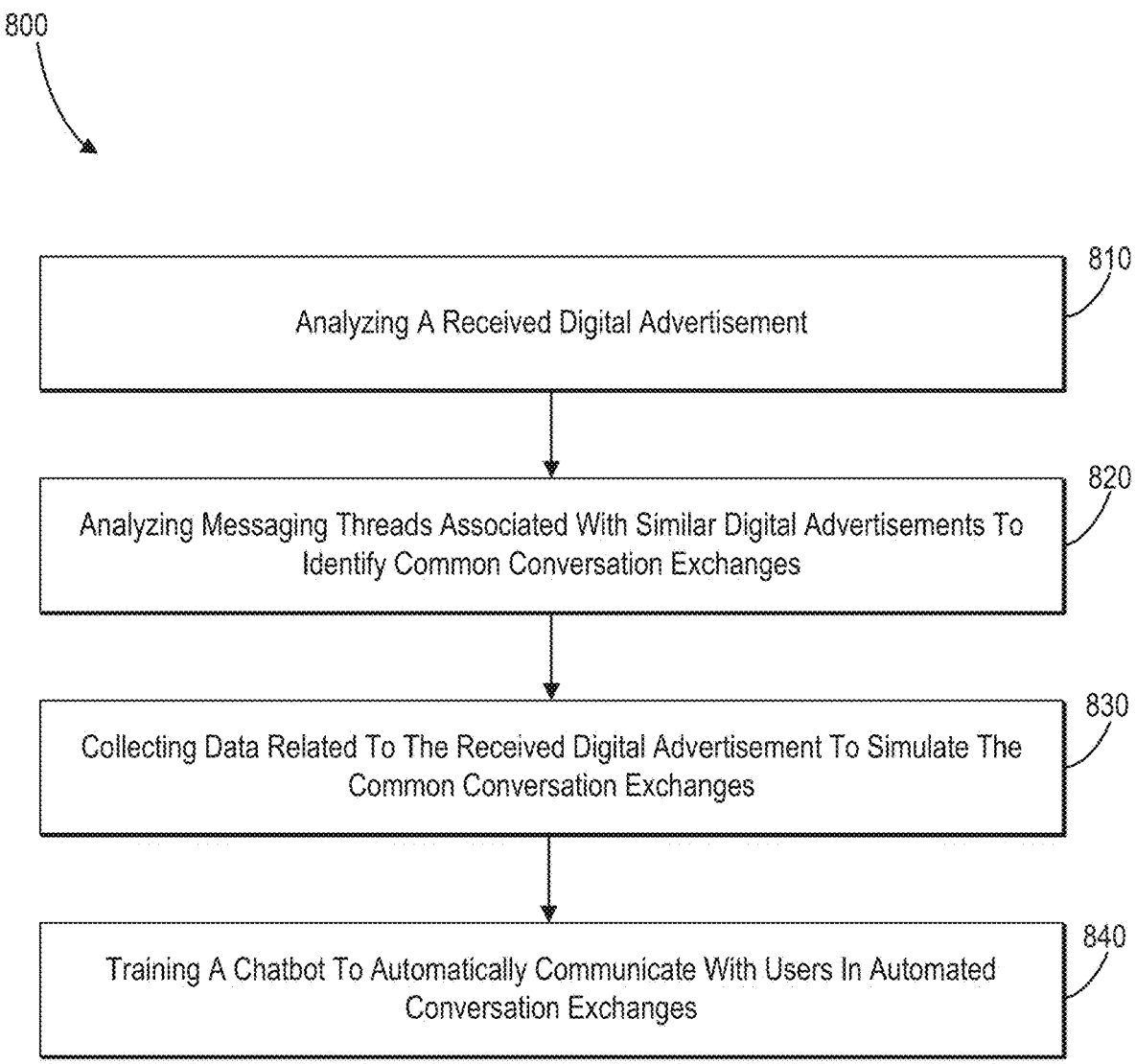
FIG. 8 illustrates a flowchart of a series of acts in a method of training a chatbot to automatically communicate with users concerning subjects related to a received digital advertisement in accordance with one or more embodiments.

Turning now to FIG. 8, this figure illustrates a flowchart of a series of acts in a method 800 of method of training a chatbot to automatically communicate with users concerning subjects related to a received digital advertisement in accordance with one or more embodiments. While FIG. 8 illustrates acts according to one embodiment, alternative embodiments may omit, add to, reorder, and/or modify any of the acts shown in FIG. 8.

As shown in FIG. 8, the method 800 includes an act 810 of analyzing a received digital advertisement. In particular, in some embodiments, the act 810 includes analyzing a received digital advertisement to determine characteristics associated with the received digital advertisement.

For example, in some embodiments, collecting data related to the received digital advertisement comprises: aggregating data related to the received digital advertisement and data related to an advertiser associated with the received digital advertisement; determining that the aggregated data does not include missing information required to simulate the common conversation exchanges; and prompting the advertiser to provide the missing information required to simulate the common conversation exchanges. Relatedly, in certain embodiments, aggregating the data related to the received digital advertisement and the data related to the advertiser associated with the received digital advertisement comprises one or more of: collecting data from contents of the received digital advertisement; collecting data from previous digital advertisements of the advertiser; collecting data from a website of the advertiser; collecting data from a social networking profile of the advertiser; collecting data from a product catalogue; or receiving responses concerning the received digital advertisement from the advertiser through a digital form.

As further shown in FIG. 8, the method 800 includes an act 820 of analyzing messaging threads associated with similar digital advertisements to identify common conversation exchanges. In particular, the act 820 includes analyzing messaging threads associated with similar digital advertisements sharing one or more characteristics with the received digital advertisement to identify common conversation exchanges associated with the messaging threads.

For example, in some embodiments, analyzing the messaging threads associated with the similar digital advertisements comprises: comparing the characteristics associated with the received digital advertisement with characteristics associated with previous digital advertisements to identify shared characteristics between the received digital advertisement and the previous digital advertisements; based on the shared characteristics, generating a similarity score for each of the previous digital advertisements, each similarity score representing a similarity between the received digital advertisement and one of the previous digital advertisements; identifying the previous digital advertisements having similarity scores above a threshold as the similar digital advertisements; and accessing the messaging threads associated with the similar digital advertisements.

Similarly, in certain embodiments, analyzing the messaging threads associated with the similar digital advertisements comprises comparing the characteristics associated with the received digital advertisement with characteristics associated with previous digital advertisements to identify shared characteristics between the received digital advertisement and the previous digital advertisements, the characteristics associated with the received digital advertisement comprising an advertisement category designated for the received digital advertisement and the characteristics associated with the previous digital advertisements comprising advertisement categories designated for the previous digital advertisements; based on the shared characteristics, generating a similarity score for each of the previous digital advertisements, each similarity score representing a similarity between the received digital advertisement and one of the previous digital advertisements; and identifying the previous digital advertisements having similarity scores above a threshold as the similar digital advertisements.

Relatedly, in some embodiments, analyzing the messaging threads associated with the similar digital advertisements comprises applying natural language processing to determine an intent of each input and each response within the messaging threads. In addition to determining intents of inputs and responses, in some embodiments, identifying the common conversation exchanges associated with the messaging threads comprises, for each common conversation exchange of the common conversation exchanges: analyzing a plurality of inputs and a plurality of responses within the messaging threads; determining that common inputs within the plurality of inputs have a shared intent and exceed a commonality threshold representing a threshold measurement of input occurrences within the messaging threads; identifying corresponding responses of the plurality of responses that are associated with the common inputs; and identifying the common inputs and the corresponding responses as one or more of the common conversation exchanges associated with the messaging threads.

In a related vein, in some such embodiments, identifying the common conversation exchanges associated with the messaging threads comprises, for each common conversation exchange of the common conversation exchanges: analyzing a plurality of inputs and a plurality of responses within the messaging threads; determining that common inputs of the plurality of inputs have a shared intent and exceed a first commonality threshold representing a threshold measurement of input occurrences within the messaging threads; determining that common responses of the plurality of responses have a shared intent and exceed a second commonality threshold representing a threshold measurement of response occurrences within the messaging threads, the common responses corresponding to the common inputs; and identifying the common inputs and the corresponding common responses as one or more of the common conversation exchanges associated with the messaging threads.

Additionally, in some embodiments, analyzing the messaging threads associated with the similar digital advertisements comprises determining that a subset of messaging threads of the messaging threads attains one or more objectives; and analyzing the subset of messaging threads to identify the common conversation exchanges associated with the messaging threads. Relatedly, in certain embodiments, determining that the subset of messaging threads attains an objective comprises determining that the subset of messaging threads by facilitating one or more of: a purchase of a product or a service advertised by the received digital advertisement; a user to submit a digital form; a visit or view of a webpage; a user to provide a user-satisfaction rating; or a detected satisfaction of a user.

As further shown in FIG. 8, the method 800 includes an act 830 of collecting data related to the received digital advertisement to simulate the common conversation exchanges. In particular, the act 830 includes, based on the common conversation exchanges, collecting data related to the received digital advertisement to simulate the common conversation exchanges within automated conversations associated with the received digital advertisement.

For example, in some embodiments, collecting the data related to the received digital advertisement to simulate the common conversation exchanges comprises: identifying input-syntax patterns and input-word entities within the common inputs; collecting input data related to the received digital advertisement that corresponds to the input-syntax patterns and the input-word entities within the common inputs; identifying response-syntax patterns and response-word entities within the common responses; and collecting response data related to the received digital advertisement that corresponds to the response-syntax patterns and the response-word entities within the common responses.

As further shown in FIG. 8, the method 800 includes an act 840 of training a chatbot to automatically communicate with users in automated conversation exchanges. In particular, the act 840 includes training a chatbot to automatically communicate with users in automated conversation exchanges related to the received digital advertisement based on the common conversation exchanges and the collected data related to the received digital advertisement.

For example, in some embodiments, training the chatbot to automatically communicate with users in automated conversation exchanges comprises: generating one or more predetermined inputs for an automated conversation exchange based on the common inputs and the collected data related to the received digital advertisement; and generating one or more predetermined responses for another automated conversation exchange based on the common responses and the collected data related to the received digital advertisement.

As another example, training the chatbot to automatically communicate with users in automated conversation exchanges comprises: training the chatbot to customize inputs for an automated conversation exchange based on the common inputs and the collected data related to the received digital advertisement; and training the chatbot to customize responses for another automated conversation exchange based on the common responses and the collected data related to the received digital advertisement.

Alternatively, in some embodiments, training the chatbot to automatically communicate with users in automated conversation exchanges comprises: training the chatbot to customize inputs for an automated conversation exchange based on input templates and the collected input data related to the received digital advertisement, the input templates comprising input-entity fields that reflect the input-syntax patterns and the input-word entities within the common inputs; and training the chatbot to customize responses for another automated conversation exchange based on response templates and the collected response data related to the received digital advertisement, the response templates comprising response-entity fields that reflect the response-syntax patterns and the response-word entities within the common responses.

Similarly, in some embodiments, training the chatbot to automatically communicate with users in automated conversation exchanges related to the received digital advertisement comprises training the chatbot to customize one or more inputs for an automated conversation exchange based on common inputs from among the subset of messaging threads and the collected data related to the received digital advertisement; and training the chatbot to customize one or more responses for another automated conversation exchange based on common responses from among the subset of messaging threads and the collected data related to the received digital advertisement.

Additionally, in certain circumstances, training the chatbot to automatically communicate with users in automated conversation exchanges related to the received digital advertisement comprises training the chatbot to initiate a payment associated with the received digital advertisement; provide a link to a webpage associated with the received digital advertisement; qualify a user for purchase of a product or service advertised by the received digital advertisement; or connect a user to a representative of an advertiser associated with the received digital advertisement.

In addition to the acts 810-840, in certain embodiments of the method 800, analyzing the received digital advertisement to determine characteristics associated with the received digital advertisement comprises detecting an advertisement category designated for the received digital advertisement; and analyzing the messaging threads associated with the similar digital advertisements comprises, before receipt of the received digital advertisement, identifying common conversation exchanges within messaging threads associated with previous digital advertisements that have had the advertisement category designated.

Additionally, in some embodiments of the method 800, analyzing the messaging threads associated with the similar digital advertisements comprises determining common sequences among the common conversation exchanges; and training the chatbot to automatically communicate with users in automated conversation exchanges related to the received digital advertisement comprises training the chatbot to order inputs and responses within a messaging thread based on the common sequences among the common conversation exchanges.

As suggested above, in some embodiments, the method 800 includes providing a chatbot preview. For example, in some embodiments, the method 800 further comprises providing to an administrator device sample inputs and sample responses as samples of potential automated conversation exchanges; providing to the administrator device a selectable option to edit the sample inputs or the sample responses; receiving from the administrator device an indication of an edit to a sample input of the sample inputs or to a sample response of the sample responses; and changing the sample input or the sample response in accordance with the received indication of the edit.

As another example, in some embodiments, the method 800 further comprises providing to an administrator device a chatbot user interface as a preview of the chatbot automatically communicating with users in automated conversation exchanges; receiving from the administrator device an input through the chatbot user interface; providing a response to the administrator device through the chatbot user interface; receiving from the administrator device an indication of an edit to the response; and based on the edit, retraining the chatbot to automatically communicate with users in automated conversation exchanges related to the received digital advertisement.

Figure 9:
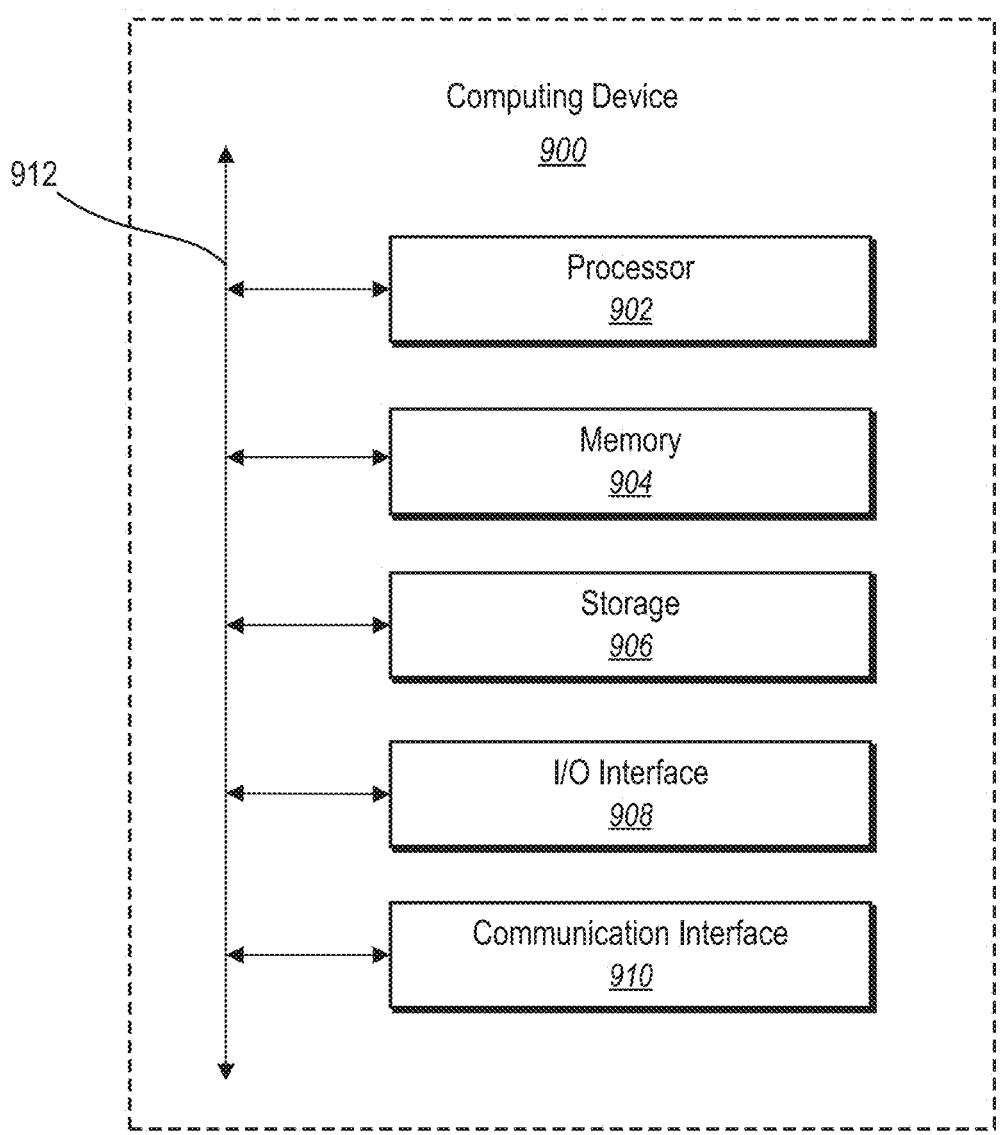
FIG. 9 illustrates a block diagram of an example computing device in accordance with one or more embodiments.

FIG. 9 illustrates a block diagram of exemplary computing device 900 that may be configured to perform one or more of the processes described above. One will appreciate that one or more computing devices such as the computing device 900 may implement the networking system 104. As shown by FIG. 9, the computing device 900 can comprise a processor 902, a memory 904, a storage device 906, an I/O interface 908, and a communication interface 910, which may be communicatively coupled by way of a communication infrastructure 912. While an exemplary computing device 900 is shown in FIG. 9, the components illustrated in FIG. 9 are not intended to be limiting. Additional or alternative components may be used in other embodiments. Furthermore, in certain embodiments, the computing device 900 can include fewer components than those shown in FIG. 9. Components of the computing device 900 shown in FIG. 9 will now be described in additional detail.

In one or more embodiments, the processor 902 includes hardware for executing instructions, such as those making up a computer program. As an example and not by way of limitation, to execute instructions, the processor 902 may retrieve (or fetch) the instructions from an internal register, an internal cache, the memory 904, or the storage device 906 and decode and execute them. In one or more embodiments, the processor 902 may include one or more internal caches for data, instructions, or addresses. As an example and not by way of limitation, the processor 902 may include one or more instruction caches, one or more data caches, and one or more translation lookaside buffers ("TLBs"). Instructions in the instruction caches may be copies of instructions in the memory 904 or the storage device 906.

The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The storage device 906 includes storage for storing data or instructions. As an example and not by way of limitation, storage device 906 can comprise a non-transitory storage medium described above. The storage device 906 may include a hard disk drive ("HDD"), flash memory, an optical disc, a magneto-optical disc, magnetic tape, or a Universal Serial Bus ("USB") drive or a combination of two or more of these. The storage device 906 may include removable or non-removable (or fixed) media, where appropriate. The storage device 906 may be internal or external to the computing device 900. In one or more embodiments, the storage device 906 is non-volatile, solid-state memory. In other embodiments, the storage device 906 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 908 allows a user to provide input to, receive output from, and otherwise transfer data to and receive data from computing device 900. The I/O interface 908 may include a mouse, a keypad or a keyboard, a touchscreen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller ("NIC") or network adapter for communicating with an Ethernet or other wire-based network or a wireless NIC ("WNIC") or wireless adapter for communicating with a wireless network, such as a WI-FI.

Additionally, or alternatively, the communication interface 910 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 910 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 912 may include hardware, software, or both that couples components of the computing device 900 to each other. As an example and not by way of limitation, the communication infrastructure 912 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings.

Figure 10:
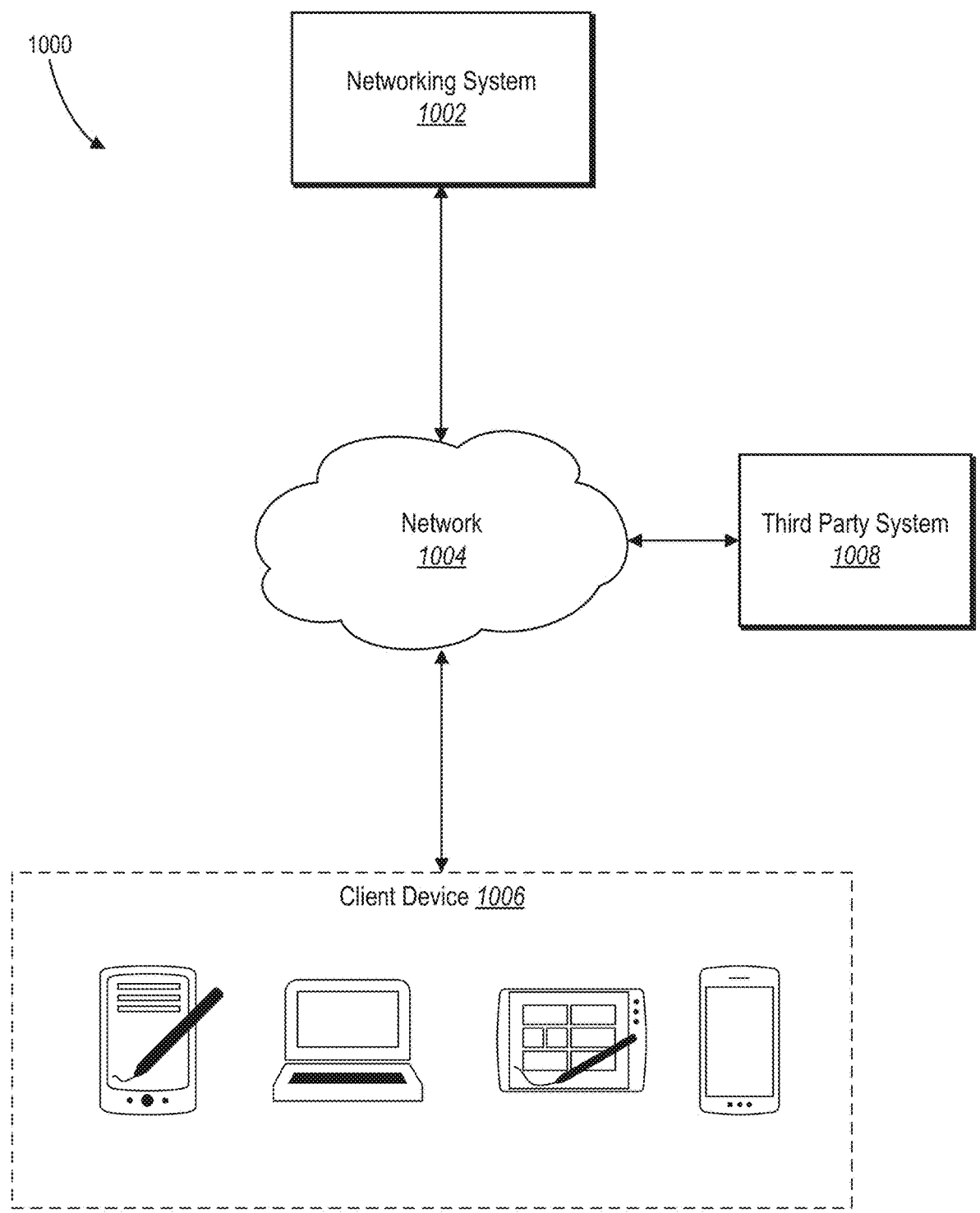
FIG. 10 illustrates a network environment of a networking system according to one or more embodiments.

FIG. 10 illustrates an example network environment 1000 of a social-networking system. Network environment 1000 includes a client device 1006, a networking system 1002, and a third-party system 1008 connected to each other by a network 1004. Although FIG. 10 illustrates a particular arrangement of client device 1006, networking system 1002, third-party system 1008, and network 1004, this disclosure contemplates any suitable arrangement of client device 1006, networking system 1002, third-party system 1008, and network 1004. As an example and not by way of limitation, two or more of client device 1006, networking system 1002, and third-party system 1008 may be connected to each other directly, bypassing network 1004. As another example, two or more of client device 1006, networking system 1002, and third-party system 1008 may be physically or logically co-located with each other in whole or in part. Moreover, although FIG. 10 illustrates a particular number of client devices 1006, networking systems 1002, third-party systems 1008, and networks 1004, this disclosure contemplates any suitable number of client devices 1006, networking systems 1002, third-party systems 1008, and networks 1004. As an example and not by way of limitation, network environment 1000 may include multiple client devices 1006, networking systems 1002, third-party systems 1008, and networks 1004.

This disclosure contemplates any suitable network 1004. As an example and not by way of limitation, one or more portions of network 1004 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1004 may include one or more networks 1004.

Links may connect client device 1006, networking system 1002, and third-party system 1008 to communication network 1004 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network ("SONET") or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links may differ in one or more respects from one or more second links.

In particular embodiments, client device 1006 may be an electronic device including hardware, software, or embedded logic components or a combination of two or more such components and capable of carrying out the appropriate functionalities implemented or supported by client device 1006. As an example and not by way of limitation, a client device 1006 may include any of the computing devices discussed above in relation to FIG. 10. A client device 1006 may enable a network user at client device 1006 to access network 1004. A client device 1006 may enable its user to communicate with other users at other client devices 1006.

In particular embodiments, client device 1006 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 1006 may enter a Uniform Resource Locator ("URL") or other address directing the web browser to a particular server (such as server, or a server associated with a third-party system 1008), and the web browser may generate a Hyper Text Transfer Protocol ("HTTP") request and communicate the HTTP request to server. The server may accept the HTTP request and communicate to client device 1006 one or more Hyper Text Markup Language ("HTML") files responsive to the HTTP request. Client device 1006 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, networking system 1002 may be a network-addressable computing system that can host an online social network. Networking system 1002 may generate, store, receive, and send social-networking data, such as, for example, user-profile data, concept-profile data, social-graph information, or other suitable data related to the online social network. Networking system 1002 may be accessed by the other components of network environment 1000 either directly or via network 1004. In particular embodiments, networking system 1002 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, networking system 1002 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1006, a networking system 1002, or a third-party system 1008 to manage, retrieve, modify, add, or delete, the information stored in data store.

In particular embodiments, networking system 1002 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Networking system 1002 may provide users of the online social network the ability to communicate and interact with other users. In particular embodiments, users may join the online social network via networking system 1002 and then add connections (e.g., relationships) to a number of other users of networking system 1002 whom they want to be connected to. Herein, the term "friend" may refer to any other user of networking system 1002 with whom a user has formed a connection, association, or relationship via networking system 1002.

In particular embodiments, networking system 1002 may provide users with the ability to take actions on various types of items or objects, supported by networking system 1002. As an example and not by way of limitation, the items and objects may include groups or social networks to which users of networking system 1002 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 1002 or by an external system of third-party system 1008, which is separate from networking system 1002 and coupled to networking system 1002 via a network 1004.

In particular embodiments, networking system 1002 may be capable of linking a variety of entities. As an example and not by way of limitation, networking system 1002 may enable users to interact with each other as well as receive content from third-party systems 1008 or other entities, or to allow users to interact with these entities through an application programming interfaces ("API") or other communication channels.

In particular embodiments, a third-party system 1008 may include one or more types of servers, one or more data stores, one or more interfaces, including but not limited to APIs, one or more web services, one or more content sources, one or more networks, or any other suitable components, e.g., that servers may communicate with. A third-party system 1008 may be operated by a different entity from an entity operating networking system 1002. In particular embodiments, however, networking system 1002 and third-party systems 1008 may operate in conjunction with each other to provide social-networking services to users of networking system 1002 or third-party systems 1008. In this sense, networking system 1002 may provide a platform, or backbone, which other systems, such as third-party systems 1008, may use to provide social-networking services and functionality to users across the Internet.

In particular embodiments, a third-party system 1008 may include a third-party content object provider. A third-party content object provider may include one or more sources of content objects, which may be communicated to a client device 1006. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, networking system 1002 also includes user-generated content objects, which may enhance a user's interactions with networking system 1002. User-generated content may include anything a user can add, upload, send, or "post" to networking system 1002. As an example and not by way of limitation, a user communicates posts to networking system 1002 from a client device 1006. Posts may include data such as status updates or other textual data, location information, photos, videos, links, music or other similar data or media. Content may also be added to networking system 1002 by a third-party through a "communication channel," such as a newsfeed or stream.

In particular embodiments, networking system 1002 may include a variety of servers, sub-systems, programs, modules, logs, and data stores. In particular embodiments, networking system 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Networking system 1002 may also include suitable components such as network interfaces, security mechanisms, load balancers, failover servers, management-and-network-operations consoles, other suitable components, or any suitable combination thereof. In particular embodiments, networking system 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 1002 to one or more client devices 1006 or one or more third-party system 1008 via network 1004. The web server may include a mail server or other messaging functionality for receiving and routing messages between networking system 1002 and one or more client devices 1006. An API-request server may allow a third-party system 1008 to access information from networking system 1002 by calling one or more APIs. An action logger may be used to receive communications from a web server about a user's actions on or off networking system 1002. In conjunction with the action log, a third-party-content-object log may be maintained of user exposures to third-party-content objects. A notification controller may provide information regarding content objects to a client device 1006. Information may be pushed to a client device 1006 as notifications, or information may be pulled from client device 1006 responsive to a request received from client device 1006. Authorization servers may be used to enforce one or more privacy settings of the users of networking system 1002. A privacy setting of a user determines how particular information associated with a user can be shared. The authorization server may allow users to opt in to or opt out of having their actions logged by networking system 1002 or shared with other systems (e.g., third-party system 1008), such as, for example, by setting appropriate privacy settings. Third-party-content-object stores may be used to store content objects received from third parties, such as a third-party system 1008. Location stores may be used for storing location information received from client devices 1006 associated with users. Advertisement-pricing modules may combine social information, the current time, location information, or other suitable information to provide relevant advertisements, in the form of notifications, to a user.

In some embodiments, privacy settings allow a user to specify (e.g., by opting out, by opting in) whether the networking system 1002 receives, collects, logs, or stores particular objects or information associated with the user for any purpose. For example, the privacy settings optionally allow the user to specify whether particular applications or processes access, store, or use particular objects or information associated with the user. In some such embodiments, the privacy settings allow the user to specify whether applications for digital advertisements may access, store, or use objects or information associated with the user (e.g., digital messages within messaging threads). The privacy settings may allow the user to opt in or opt out of having objects or information accessed, stored, or used by specific applications or processes (e.g., training a chatbot). The networking system 1002 may access such information in order to provide a particular function or service to the user without the networking system 1002 having access to that information for any other purposes. Before accessing, storing, or using such objects or information, including digital messages within messaging threads, the networking system 1002 may prompt the user to provide privacy settings specifying which applications or processes, if any, may access, store, or use the object or information prior to allowing any such action. As an example and not by way of limitation, a user may transmit a digital message to another user via a messaging application and may specify privacy settings that such digital messages should not be accessed, stored, or used by the networking system 1002 for digital advertisements or for training a chatbot.

Figure 11:
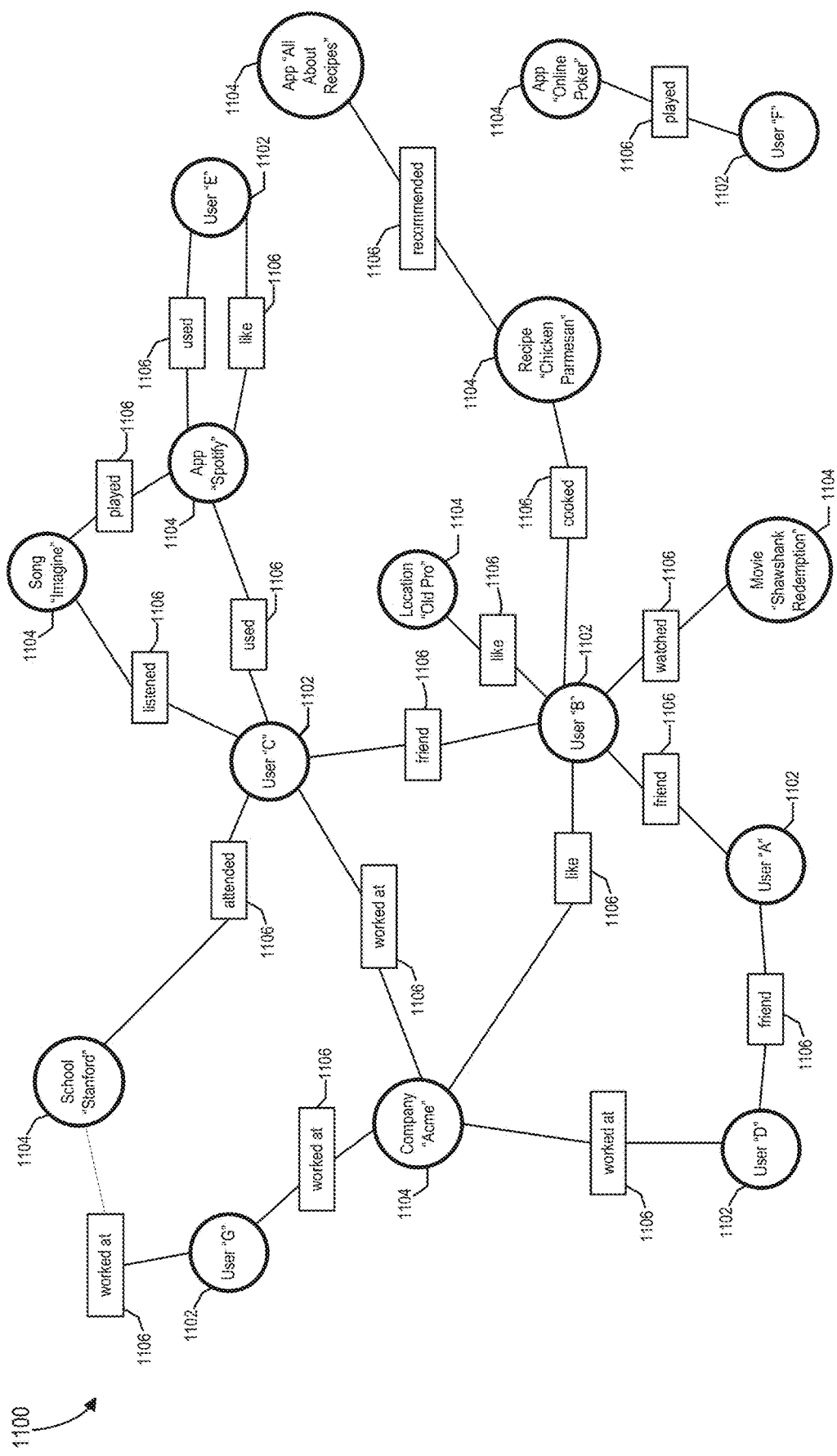
FIG. 11 illustrates an example social graph for a networking system in accordance with one or more embodiments.

FIG. 11 illustrates example social graph 1100. In particular embodiments, networking system 1002 may store one or more social graphs 1100 in one or more data stores. In particular embodiments, social graph 1100 may include multiple nodes—which may include multiple user nodes 1102 or multiple concept nodes 1104—and multiple edges 1106 connecting the nodes. Example social graph 1100 illustrated in FIG. 11 is shown, for didactic purposes, in a two-dimensional visual map representation. In particular embodiments, a networking system 1002, client device 1006, or third-party system 1008 may access social graph 1100 and related social-graph information for suitable applications. The nodes and edges of social graph 1100 may be stored as data objects, for example, in a data store (such as a social-graph database). Such a data store may include one or more searchable or query able indexes of nodes or edges of social graph 1100.

In particular embodiments, a user node 1102 may correspond to a user of networking system 1002. As an example and not by way of limitation, a user may be an individual (human user), an entity (e.g., an enterprise, business, or third-party application), or a group (e.g., of individuals or entities) that interacts or communicates with or over networking system 1002. In particular embodiments, when a user registers for an account with networking system 1002, networking system 1002 may create a user node 1102 corresponding to the user, and store the user node 1102 in one or more data stores. Users and user nodes 1102 described herein may, where appropriate, refer to registered users and user nodes 1102 associated with registered users. In addition, or as an alternative, users and user nodes 1102 described herein may, where appropriate, refer to users that have not registered with networking system 1002. In particular embodiments, a user node 1102 may be associated with information provided by a user or information gathered by various systems, including networking system 1002. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1104 may correspond to a concept. As an example and not by way of limitation, a concept may correspond to a place (such as, for example, a movie theater, restaurant, landmark, or city); a website (such as, for example, a website associated with networking system 1002 or a third-party website associated with a web-application server); an entity (such as, for example, a person, business, group, sports team, or celebrity); a resource (such as, for example, an audio file, video file, digital photo, text file, structured document, or application) which may be located within networking system 1002 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1104 may be associated with information of a concept provided by a user or information gathered by various systems, including networking system 1002. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1104 may be associated with one or more data objects corresponding to information associated with concept nodes 1104. In particular embodiments, a concept node 1104 may correspond to one or more webpages.

In particular embodiments, a node in social graph 1100 may represent or be represented by a webpage (which may be referred to as a "profile page"). Profile pages may be hosted by or accessible to networking system 1002. Profile pages may also be hosted on third-party websites associated with a third-party system 1008. As an example and not by way of limitation, a profile page corresponding to a particular external webpage may be the particular external webpage and the profile page may correspond to a particular concept node 1104. Profile pages may be viewable by all or a selected subset of other users. As an example and not by way of limitation, a user node 1102 may have a corresponding user-profile page in which the corresponding user may add content, make declarations, or otherwise express himself or herself. As another example and not by way of limitation, a concept node 1104 may have a corresponding concept-profile page in which one or more users may add content, make declarations, or express themselves, particularly in relation to the concept corresponding to concept nodes 1104.

In particular embodiments, a concept node 1104 may represent a third-party webpage or resource hosted by a third-party system 1008. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 1006 to send to networking system 1002 a message indicating the user's action. In response to the message, networking system 1002 may create an edge (e.g., an "eat" edge) between a user node 1102 corresponding to the user and a concept node 1104 corresponding to the third-party webpage or resource and store edge 1106 in one or more data stores.

In particular embodiments, a pair of nodes in social graph 1100 may be connected to each other by one or more edges 1106. An edge 1106 connecting a pair of nodes may represent a relationship between the pair of nodes. In particular embodiments, an edge 1106 may include or represent one or more data objects or attributes corresponding to the relationship between a pair of nodes. As an example and not by way of limitation, a first user may indicate that a second user is a "friend" of the first user. In response to this indication, networking system 1002 may send a "friend request" to the second user. If the second user confirms the "friend request," networking system 1002 may create an edge 1106 connecting the first user's user node 1102 to the second user's user node 1102 in social graph 1100 and store edge 1106 as social-graph information in one or more of data stores. In the example of FIG. 11, social graph 1100 includes an edge 1106 indicating a friend relation between user nodes 1102 of user "A" and user "B" and an edge indicating a friend relation between user nodes 1102 of user "C" and user "B." Although this disclosure describes or illustrates particular edges 1106 with particular attributes connecting particular user nodes 1102, this disclosure contemplates any suitable edges 1106 with any suitable attributes connecting user nodes 1102. As an example and not by way of limitation, an edge 1106 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1100 by one or more edges 1106.

In particular embodiments, an edge 1106 between a user node 1102 and a concept node 1104 may represent a particular action or activity performed by a user associated with user node 1102 toward a concept associated with a concept node 1104. As an example and not by way of limitation, as illustrated in FIG. 11, a user may "like," "attended," "played," "listened," "cooked," "worked at," or "watched" a concept, each of which may correspond to an edge type or subtype. A concept-profile page corresponding to a concept node 1104 may include, for example, a selectable "check in" icon (such as, for example, a clickable "check in" icon) or a selectable "add to favorites" icon. Similarly, after a user clicks these icons, networking system 1002 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, networking system 1002 may create a "listened" edge 1106 and a "used" edge (as illustrated in FIG. 11) between user nodes 1102 corresponding to the user and concept nodes 1104 corresponding to the song and application to indicate that the user listened to the song and used the application. Moreover, networking system 1002 may create a "played" edge 1106 (as illustrated in FIG. 11) between concept nodes 1104 corresponding to the song and the application to indicate that the particular song was played by the particular application. In this case, "played" edge 1106 corresponds to an action performed by an external application (SPOTIFY) on an external audio file (the song "Imagine"). Although this disclosure describes particular edges 1106 with particular attributes connecting user nodes 1102 and concept nodes 1104, this disclosure contemplates any suitable edges 1106 with any suitable attributes connecting user nodes 1102 and concept nodes 1104. Moreover, although this disclosure describes edges between a user node 1102 and a concept node 1104 representing a single relationship, this disclosure contemplates edges between a user node 1102 and a concept node 1104 representing one or more relationships. As an example and not by way of limitation, an edge 1106 may represent both that a user likes and has used at a particular concept. Alternatively, another edge 1106 may represent each type of relationship (or multiples of a single relationship) between a user node 1102 and a concept node 1104 (as illustrated in FIG. 11 between user node 1102 for user "E" and concept nodes 1104 for "SPOTIFY").

In particular embodiments, networking system 1002 may create an edge 1106 between a user node 1102 and a concept node 1104 in social graph 1100. As an example and not by way of limitation, a user viewing a concept-profile page (such as, for example, by using a web browser or a special-purpose application hosted by the user's client device 1006) may indicate that he or she likes the concept represented by the concept nodes 1104 by clicking or selecting a "Like" icon, which may cause the user's client device 1006 to send to networking system 1002 a message indicating the user's liking of the concept associated with the concept-profile page. In response to the message, networking system 1002 may create an edge 1106 between user node 1102 associated with the user and concept nodes 1104, as illustrated by "like" edge 1106 between the user and concept nodes 1104. In particular embodiments, networking system 1002 may store an edge 1106 in one or more data stores. In particular embodiments, an edge 1106 may be automatically formed by networking system 1002 in response to a particular user action. As an example and not by way of limitation, if a first user uploads a picture, watches a movie, or listens to a song, an edge 1106 may be formed between user node 1102 corresponding to the first user and concept nodes 1104 corresponding to those concepts. Although this disclosure describes forming particular edges 1106 in particular manners, this disclosure contemplates forming any suitable edges 1106 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on networking system 1002). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, networking system 1002 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through networking system 1002) or RSVP (e.g., through networking system 1002) to an event associated with the advertisement. In addition or as an alternative, an advertisement may include social-networking-system context directed to the user. As an example and not by way of limitation, an advertisement may display information about a friend of the user within networking system 1002 who has taken an action associated with the subject matter of the advertisement.

In particular embodiments, networking system 1002 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1008 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, networking system 1002 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, networking system 1002 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 1002 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, networking system 1002 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, networking system 1002 may calculate a coefficient based on a user's actions. Networking system 1002 may monitor such actions on the online social network, on a third-party system 1008, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, networking system 1002 may calculate a coefficient based on the user's actions with particular types of content. The content may be associated with the online social network, a third-party system 1008, or another suitable system. The content may include users, profile pages, posts, news stories, headlines, instant messages, chat room conversations, emails, advertisements, pictures, video, music, other suitable objects, or any combination thereof. Networking system 1002 may analyze a user's actions to determine whether one or more of the actions indicate an affinity for subject matter, content, other users, and so forth. As an example and not by way of limitation, if a user may make frequently posts content related to "coffee" or variants thereof, networking system 1002 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, networking system 1002 may calculate a coefficient based on the type of relationship between particular objects. Referencing the social graph 1100, networking system 1002 may analyze the number and/or type of edges 1106 connecting particular user nodes 1102 and concept nodes 1104 when calculating a coefficient. As an example and not by way of limitation, user nodes 1102 that are connected by a spouse-type edge (representing that the two users are married) may be assigned a higher coefficient than user nodes 1102 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, networking system 1002 may determine that the user has a higher coefficient with respect to the first photo than the second photo because having a tagged-in-type relationship with content may be assigned a higher weight and/or rating than having a like-type relationship with content. In particular embodiments, networking system 1002 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, networking system 1002 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1100. As an example and not by way of limitation, social-graph entities that are closer in the social graph 1100 (i.e., fewer degrees of separation) may have a higher coefficient than entities that are further apart in the social graph 1100.

In particular embodiments, networking system 1002 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 1006 of the user). A first user may be more interested in other users or concepts that are closer to the first user. As an example and not by way of limitation, if a user is one mile from an airport and two miles from a gas station, networking system 1002 may determine that the user has a higher coefficient for the airport than the gas station based on the proximity of the airport to the user.

In particular embodiments, networking system 1002 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 1002 may provide information that is relevant to user's interests and current circumstances, increasing the likelihood that they will find such information of interest. In particular embodiments, networking system 1002 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, networking system 1002 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, networking system 1002 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1008 (e.g., via an API or other communication channel), or from another suitable system. In response to the request, networking system 1002 may calculate the coefficient (or access the coefficient information if it has previously been calculated and stored). In particular embodiments, networking system 1002 may measure an affinity with respect to a particular process. Different processes (both internal and external to the online social network) may request a coefficient for a particular object or set of objects. Networking system 1002 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or acts disclosed in U.S. patent application Ser. No. 11/503,093, filed 11 Aug. 2006, U.S. patent application Ser. No. 12/978,027, filed 22 Dec. 2010, U.S. patent application Ser. No. 12/978,265, filed 23 Dec. 2010, and U.S. patent application Ser. No. 13/642,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1104 corresponding to a particular photo may have a privacy setting specifying that the photo may only be accessed by users tagged in the photo and their friends. In particular embodiments, privacy settings may allow users to opt in or opt out of having their actions logged by networking system 1002 or shared with other systems (e.g., third-party system 1008). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1008, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, networking system 1002 may send a request to the data store for the object. The request may identify the user associated with the request and may only be sent to the user (or a client device 1006 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
analyzing a received digital advertisement to determine characteristics associated with the received digital advertisement;
analyzing messaging threads associated with similar digital advertisements sharing one or more characteristics with the received digital advertisement, the messaging threads comprising inputs and responses between users of a social networking system and representatives of advertisers associated with the similar digital advertisements;
identifying, from among the messaging threads associated with the similar advertisements, common conversation exchanges comprising pairs of common inputs by the representatives of advertisers and corresponding responses by one or more users of the social networking system to the common inputs;
based on the common conversation exchanges, collecting data related to the received digital advertisement to simulate the common conversation exchanges within automated conversations associated with the received digital advertisement; and training a chatbot to automatically communicate with users in automated conversation exchanges related to the received digital advertisement by:

identifying word entities and syntax patterns from the pairs of common inputs by the representatives of advertisers and the corresponding responses by the one or more users of the social networking system within the common conversation exchanges; and constructing inputs and responses simulating the pairs of common inputs by the representatives of advertisers and the corresponding responses by the one or more users of the social networking system, wherein the inputs and responses incorporate words or phrases from the collected data related to the received digital advertisement.

2. The method of claim 1, wherein collecting data related to the received digital advertisement comprises:

aggregating data related to the received digital advertisement and data related to an advertiser associated with the received digital advertisement;

determining that the aggregated data does not include missing information required to simulate the common conversation exchanges; and prompting the advertiser to provide the missing information required to simulate the common conversation exchanges.

3. The method of claim 2, wherein aggregating the data related to the received digital advertisement and the data related to the advertiser associated with the received digital advertisement comprises one or more of:

collecting data from contents of the received digital advertisement;

collecting data from previous digital advertisements of the advertiser;

collecting data from a website of the advertiser;

collecting data from a social networking profile of the advertiser;

collecting data from a product catalogue; or receiving responses concerning the received digital advertisement from the advertiser through a digital form.

4. The method of claim 1, wherein analyzing the messaging threads associated with the similar digital advertisements comprises:

comparing the characteristics associated with the received digital advertisement with characteristics associated with previous digital advertisements to identify shared characteristics between the received digital advertisement and the previous digital advertisements;

based on the shared characteristics, generating a similarity score for each of the previous digital advertisements, each similarity score representing a similarity between the received digital advertisement and one of the previous digital advertisements;

identifying the previous digital advertisements having similarity scores above a threshold as the similar digital advertisements; and accessing the messaging threads associated with the similar digital advertisements.

5. The method of claim 4, wherein analyzing the messaging threads associated with the similar digital advertisements comprises applying natural language processing to determine an intent of each input and each response within the messaging threads.

6. The method of claim 5, further comprising:

identifying, from among the messaging threads associated with the similar advertisements, additional common conversation exchanges comprising pairs of common inputs by the one or more users of the social networking system and corresponding responses by the representatives of advertisers to the common inputs;

based on the additional common conversation exchanges, collecting data related to the received digital advertisement to simulate the additional common conversation exchanges within automated conversations associated with the received digital advertisement; and training the chatbot to automatically communicate with users in automated conversation exchanges related to the received digital advertisement based on the common conversation exchanges and the additional common conversation exchanges.

7. The method of claim 5, wherein identifying the common conversation exchanges associated with the messaging threads comprises, for each common conversation exchange of the common conversation exchanges:

analyzing a plurality of inputs and a plurality of responses within the messaging threads;

determining that the common inputs within the plurality of inputs have a shared intent and exceed a first commonality threshold representing a threshold measurement of input occurrences within the messaging threads;

determining that common responses by the one or more users of the social networking system to the common inputs within the plurality of responses have a shared intent and exceed a second commonality threshold representing a threshold measurement of response occurrences within the messaging threads; and identifying common pairs of the common inputs and the common responses as one or more of the common conversation exchanges associated with the messaging threads.

8. The method of claim 1, further comprising:

identifying, from among the common conversation exchanges, common sequences comprising a repeated pair of a common input and a corresponding response to the common input; and training the chatbot to order one or more inputs and one or more responses within a messaging thread based on the common sequences.

9. The method of claim 1, wherein training the chatbot to automatically communicate with users in automated conversation exchanges comprises:

training the chatbot to customize inputs for an automated conversation exchange based on the common inputs and the collected data related to the received digital advertisement by:

identifying one or more word entities and one or more syntax patterns from the common inputs by the representatives of advertisers; and incorporating one or more words or one or more phrases from the common inputs to customize an input.

10. The method of claim 7, wherein collecting the data related to the received digital advertisement to simulate the common conversation exchanges comprises:

identifying input-syntax patterns and input-word entities within the common inputs;

collecting input data related to the received digital advertisement that corresponds to the input-syntax patterns and the input-word entities within the common inputs by the representatives of advertisers;

identifying response-syntax patterns and response-word entities within the common responses by the one or more users of the social networking system; and collecting response data related to the received digital advertisement that corresponds to the response-syntax patterns and the response-word entities within the common responses.

11. The method of claim 10, wherein training the chatbot to automatically communicate with users in automated conversation exchanges comprises:

training the chatbot to customize inputs for an automated conversation exchange based on input templates and the collected input data related to the received digital advertisement, the input templates comprising input-entity fields that reflect the input-syntax patterns and the input-word entities within the common inputs; and training the chatbot to customize responses for another automated conversation exchange based on response templates and the collected response data related to the received digital advertisement, the response templates comprising response-entity fields that reflect the response-syntax patterns and the response-word entities within the common responses.

12. A system comprising:

at least one processor; and at least one non-transitory computer readable storage medium storing instructions that, when executed by the at least one processor, cause the system to:

analyze a received digital advertisement to determine characteristics associated with the received digital advertisement;

analyze messaging threads associated with similar digital advertisements sharing one or more characteristics with the received digital advertisement, the messaging threads comprising inputs and responses between users of a social networking system and representatives of advertisers associated with the similar digital advertisements;

identify, from among the messaging threads associated with the similar advertisements, common conversation exchanges comprising pairs of common inputs by the representatives of advertisers and corresponding responses by one or more users of the social networking system to the common input;

based on the common conversation exchanges, collect data related to the received digital advertisement to simulate the common conversation exchanges within automated conversations associated with the received digital advertisement; and train a chatbot to automatically communicate with users in automated conversation exchanges related to the received digital advertisement by:

identifying word entities and syntax patterns from the pairs of common inputs by the representatives of advertisers and the corresponding responses by the one or more users of the social networking system within the common conversation exchanges; and constructing inputs and responses simulating the pairs of common inputs by the representatives of advertisers and the corresponding responses by the one or more users of the social networking system, wherein the inputs and responses incorporate words or phrases from the collected data related to the received digital advertisement.

13. The system of claim 12, further comprising instruction that, when executed by the at least one processor, cause the system to:

analyze the messaging threads associated with the similar digital advertisements by identifying, from among the common conversation exchanges, common sequences comprising a repeated pair of a common input and a corresponding response to the common input; and train the chatbot to order one or more inputs and one or more responses within a messaging thread based on the common sequences.

14. The system of claim 12, further comprising instructions that, when executed by the at least one processor, cause the system to analyze the messaging threads associated with the similar digital advertisements by:

comparing the characteristics associated with the received digital advertisement with characteristics associated with previous digital advertisements to identify shared characteristics between the received digital advertisement and the previous digital advertisements, the characteristics associated with the received digital advertisement comprising an advertisement category designated for the received digital advertisement and the characteristics associated with the previous digital advertisements comprising advertisement categories designated for the previous digital advertisements;

based on the shared characteristics, generating a similarity score for each of the previous digital advertisements, each similarity score representing a similarity between the received digital advertisement and one of the previous digital advertisements; and identifying the previous digital advertisements having similarity scores above a threshold as the similar digital advertisements.

15. The system of claim 12, further comprising instructions that, when executed by the at least one processor, cause the system to analyze the messaging threads associated with the similar digital advertisements by:

determining that a subset of messaging threads of the messaging threads attains one or more objectives; and analyzing the subset of messaging threads to identify the common conversation exchanges.

16. The system of claim 15, further comprising instructions that, when executed by the at least one processor, cause the system to determine that the subset of messaging threads attains the objective by determining that the subset of messaging threads facilitate one or more of:

a purchase of a product or a service advertised by the received digital advertisement;

a user to submit a digital form;

a visit or view of a webpage;

a user to provide a user-satisfaction rating; or a detected satisfaction of a user.

17. The system of claim 15, further comprising instructions that, when executed by the at least one processor, cause the system to train the chatbot to customize one or more inputs for an automated conversation exchange based on the common inputs from among the subset of messaging threads and the collected data related to the received digital advertisement by:

identifying one or more word entities and one or more syntax patterns from the common inputs by the representatives of advertiser; and incorporating one or more words or one or more phrases from the common inputs to customize an input.

18. The system of claim 12, further comprising instructions that, when executed by the at least one processor, cause the system to:
- provide to an administrator device sample inputs and sample responses as samples of potential automated conversation exchanges;
- provide to the administrator device a selectable option to edit the sample inputs or the sample responses;
- receive from the administrator device an indication of an edit to a sample input of the sample inputs or to a sample response of the sample responses; and
- change the sample input or the sample response in accordance with the received indication of the edit.

19. The system of claim 12, further comprising instructions that, when executed by the at least one processor, cause the system to:
- provide to an administrator device a chatbot user interface as a preview of the chatbot automatically communicating with users in automated conversation exchanges;
- receive from the administrator device an input through the chatbot user interface;
- provide a response to the administrator device through the chatbot user interface;
- receive from the administrator device an indication of an edit to the response; and
- based on the edit, retrain the chatbot to automatically communicate with users in automated conversation exchanges related to the received digital advertisement.

20. A non-transitory computer readable medium storing instructions thereon that, when executed by at least one processor, cause a computing device to:
- analyze a received digital advertisement to determine characteristics associated with the received digital advertisement;
- analyze messaging threads associated with similar digital advertisements sharing one or more characteristics with the received digital advertisement, the messaging threads comprising inputs and responses between users of a social networking system and representatives of advertisers associated with the similar digital advertisements;
- identify, from among the messaging threads associated with the similar advertisements, common conversation exchanges comprising pairs of common inputs by the representatives of advertisers and corresponding responses by one or more users of the social networking system to the common inputs;
- based on the common conversation exchanges, collect data related to the received digital advertisement to simulate the common conversation exchanges within automated conversations associated with the received digital advertisement; and
- train a chatbot to automatically communicate with users in automated conversation exchanges related to the received digital advertisement by:
  - identifying word entities and syntax patterns from the pairs of common inputs by the representatives of advertisers and the corresponding responses by the one or more users of the social networking system within the common conversation exchanges; and
  - constructing inputs and responses simulating the pairs of common inputs by the representatives of advertisers and the corresponding responses by the one or more users of the social networking system, wherein the inputs and responses incorporate words or phrases from the collected data related to the received digital advertisement.

* * * * *